United States Patent [19]

Verplanken et al.

[11] Patent Number: 5,561,807
[45] Date of Patent: Oct. 1, 1996

[54] METHOD AND DEVICE OF MULTICASTING DATA IN A COMMUNICATIONS SYSTEM

[75] Inventors: Fabrice Verplanken, Cagnes-Sur-Mer; Claude Basso, Nice; Didier Giroir, Cagnes-Sur-Mer; Jean Calvignac, La Gaude; Claude Galand, Cagnes-Sur-Mer, all of France

[73] Assignee: International Business Machines Corporation, Armonk, N.Y.

[21] Appl. No.: 234,193

[22] Filed: Apr. 28, 1994

[30] Foreign Application Priority Data

Apr. 29, 1993 [EP] European Pat. Off. ............. 93480047

[51] Int. Cl.$^6$ ................................................. G06F 15/16
[52] U.S. Cl. .................... 395/800; 395/700; 395/650; 395/200.08; 395/309
[58] Field of Search ...................... 395/820, 325, 395/200.07, 700, 650, 309, 200.08; 370/60, 79

[56] References Cited

U.S. PATENT DOCUMENTS

| | | | |
|---|---|---|---|
| 4,507,781 | 3/1985 | Alvarez, III et al. | 370/95.3 |
| 5,148,527 | 9/1992 | Basso et al. | 395/309 |
| 5,197,065 | 3/1993 | Calvignac et al. | 370/79 |
| 5,333,269 | 7/1994 | Calvignac et al. | 395/200.08 |
| 5,390,173 | 2/1995 | Spinney et al. | 370/60 |

FOREIGN PATENT DOCUMENTS 0365731  10/1988  European Pat. Off. ........ G06F 15/16

OTHER PUBLICATIONS

IBM Technical Disclosure Bulletin, vol. 34, No. 10A, Mar. 1992, New York US pp. 464–465, "Multicast/Broadcast Mechanism for a Shared Buffer Packet Switch".

*Primary Examiner*—Alyssa H. Bowler
*Assistant Examiner*—John Follansbee
*Attorney, Agent, or Firm*—Joscelyn G. Cockburn

[57] ABSTRACT

An apparatus and method for multicasting messages stored in data buffers of a data storage. Each message is composed of data stored in a plurality of the data buffers. Each data buffer is controlled and mapped to a unique direct control block (DCB) which stores information characterizing the data buffer. By chaining the DCBs variable length, messages can be generated. Indirect control blocks (ICB) stores information characterizing the data or messages duplicated and points to a DCB. A field in the DCB carries a count representing the number of times the message is to be duplicated.

2 Claims, 19 Drawing Sheets

METHOD AND DEVICE OF MULTICASTING DATA IN A COMMUNICATIONS SYSTEM

FIELD OF THE INVENTION

The present invention relates to a method and a device of multicasting data or messages to a plurality of users which are connected to a shared memory in a communications system.

BACKGROUND ART

In a communications controller to which are connected a plurality of users, the data or messages broadcasts require that the data be duplicated as many times as there are users to which the data or the messages are to be transferred. Two main drawbacks spring from this problem of multicasting.

Firstly, in a data store in which to each user corresponds its own memory space, re-writing a message many times in each memory space for different users affects the performance of the machine because of the writing delays.

Secondly, the storage of the messages in the data store for different users represents a waste of memory space.

Therefore, it is necessary to provide a device and a method which enable improving the performance of multicasting a message by avoiding the execution of useless operations of re-writing and re-deleting the memory space of each user.

In a communications network, the control systems located at the network node have to service more and more users through high speed links. A system provided with the capability of servicing high speed communication links via a high speed adapter is described in the Patent Application EP A 244 544. The system comprises a central control unit running a network control program which assigns buffers of the central control unit memory to the user links. The high speed adapter is provided with buffering means into which the data portion of the received frames are assembled to be stored into the memory of the central control unit through a direct memory access path. The performance of such a system is limited by the fact that the messages have to be managed by the microcode and that the message exchanges require the intervention of the central control unit.

A mechanism for transferring messages between source and destination users through a shared memory has also been disclosed in the European application whose publication number is EP A1 365 731. The invention provides a mechanism, implemented in a communication network node, which enables messages to be exchanged between the adapters connected to the same shared memory and wherein the exchanges do not require any intervention of a costly central control unit. The mechanism is a major improvement in the exchange mechanism. Even though its implementation enables short messages to be exchanged without any risk of over-run, the throughput of the line interface module, in term of megabits per second, is not acceptable when the packet size decreases. This drawback may be avoided by devising an improved line interface module which enables to accessing of the shared memory in a more efficient way.

The line interface module (LIM) architecture in the prior art, refer to FIG. 1-A, is based on a shared memory "data store" (100) that provides a data repository and on a message transfer mechanism to its users. The data store consists of a buffered partition of 4 Megabytes of RAM and a linear partition of RAM. This shared memory is connected to a data store manager DSM (110) which controls the storage in the shared memory and is also an arbiter for the DS bus. The DSM is connected through a Data Store Bus (101) which is 4-byte wide, 40 ns cycle time that gives a 800 Mbps capability, to:

- a local store (120) dedicated to a microprocessor,
- a microprocessor (130) with its own local store holding instructions and data, this microprocessor may be an Intel 486,
- a Device Communication Server (DCS) (140), and
- a Data Store Interface (DSI) (150) disclosed in detail in the European Patent Application EP A1 365 731. This DSI is connected to a plurality of interface adapters (IFA) and scanners (152) through a High Performance Parallel Bus (HPPB) (102) which is 2 bytes wide and 60 ns cycle time that gives a 260 Mbps speed. A second DSI is used to interface a Connectivity SubSystem Switch (154) through a specific bus which is at 128 Mbps full duplex. The CSS switch enables interconnection several LIMs.

The DCS comprises a Free Buffer Supplier (FBS) and a Global Order Machine (GOM), not shown in this FIG. 1-A, which centralizes all the global orders also called primitives thru which the users of the shared data store (100) exchange messages. To execute the global orders, the users invoke the GOM via the data store bus. There are four global orders:

lease buffer: a 256-byte buffer is removed from a free buffer queue stored in the data store and allocated to a user that has requested this operation. This user can then write the data inside this newly acquired buffer. Only one buffer is removed for this operation.

enqueue message: a set of chained buffers forming a message are put into a queue belonging to the user that has requested this operation. That user can then dispatch the set of chained buffers to process the message.

dequeue message: a message is taken by a user from one of its queues in order to process that message.

release message: a set of chained buffers is moved back into the free buffer queue.

In this way, the messages in the shared memory can be transferred between different users without moving the data, but by manipulating the control blocks associated to each buffer or message.

This LIM architecture has been developed with an objective of exchanging data in a flexible way thanks to the organization of the control blocks which are stored as well as the messages in the data store. The mechanism for exchanging data is flexible in the sense that it enables the users to exchange messages by invoking primitives, to define any configurations in terms of priority, number of queues etc. . . .

Therefore, the main drawback of this LIM architecture is that it is tuned for the handling of low-speed and medium-speed communication links (up to T1 speed which is 1.5 Mbits per second) where there is no need to optimize that much the primitive operations. The flexibility has been traded against the efficiency because the bus speed is oversized when compared to the link speed.

Such a statement becomes no longer valid if the media speed has to reach the rate of T3 (45 Mbits per second) and OC3 which is three times the T3 rates. Indeed, the processing overhead due to the bus arbitration and to the passing of control messages over the DS bus, limits the throughput of the bus. As is shown in FIG. 1-B, this throughput is much dependant on the packet length. It is equal to 400 Mbps for 4 Kbytes packets, and it is reduced to 22 Mbps for 12 bytes packets. Therefore, this limitation precludes the use of the LIM to support any type of traffic around or above the T3 rate with a satisfactory media utilization.

The environment in which the invention may be implemented is described in detail in the patent application EP A1 365 731. Indeed, the present invention requires that the memory space be organized in such a way that it contains at least a buffered space wherein each page of the buffered space is divided in a number of M+1 buffers with M buffers devoted to the storage of data and one control buffer divided into M control blocks. The control blocks are devoted to the storage of buffer and chaining information. Each data buffer has a fixed address relationship with a buffer control block. The conception of the linear space to be associated to the buffered space in the shared memory described in the patent application mentioned above is also required for the present invention but it is not necessary to centralize it in the shared memory as well as the control blocks which can also be accessed separately from the data buffers.

SUMMARY OF THE INVENTION

The main object of the invention is to provide a method and an apparatus for improving the performance of multicasting by avoiding execution of useless operations of re-writing and re-deleting, the multicast data. The invention also saves the memory space in the data storage.

To attain the above mentioned object of the present invention, the basic idea is to dissociate the notions of the message contents (data) from the message control blocks (control blocks representing the message) in order to perform the data multicast to each destination user without duplicating the data. Therefore, it becomes possible to multicast data or a message by duplicating only the message control blocks and to manipulate these control blocks according to the method and the apparatus set forth hereinafter.

The method and apparatus could be implemented in a communication system comprising a memory which is shared by a plurality of users, each one receiving and transmitting messages to each other. In the present system, a message is composed of a plurality of data buffers stored in the memory and each data buffer is controlled and mapped to a unique direct control block (DCB) which stores the characteristics of said data buffer. The chaining of the DCB forms the whole message which may be multicast to a plurality of users. Therefore, in order to improve the performance of such communications system, one may duplicate the message as many times as necessary without rewriting the data in the personal storage of each user by using an indirect control block (ICB) which represents the message duplicated. Each ICB stores the characteristics of the message duplicated and points to a DCB. A field in the DCB carries a count representing the number of duplication of the message. The DCB and ICB stores different fields which are required in order to perform the operations of lease control block from the free queues, the operations of message enqueue in the user queue, the operations of message dequeue from the user queue, and the operations of message release to the free queues. Two separate free queues FDCBQ and FICBQ chaining the free DCB and ICB are provided and are controlled by two control blocks FDQCB and FIQCB.

The present apparatus and method may also be used for multicasting data buffer which composes a message by adding new fields in the ICB. In this case, the message to be multicast may have a content different from the original one, which requires, therefore, that to each ICB correspond a unique DCB.

The method of multicasting messages to be used therein comprises the steps of:

(a) organizing said plurality of control blocks in a plurality of direct control blocks (DCB) wherein each said direct control block is associated to a data buffer the address of which has a predetermined relationship with the address of the corresponding direct control block, (b) building a free direct control block queue (FDCBQ) which stores the addresses of all the free direct control blocks and chaining said free DCBs, said queue being controlled by a control block (FDQCB) which stores the addresses of the first and the last free direct control blocks respectively in its head (H) field and its tail (T) field, (c) organizing said plurality of control blocks in a plurality of indirect control blocks (ICB) to enable the multicast function to be performed message by message, (d) building a free indirect control block queue (FICBQ) which stores the addresses of all the free indirect control blocks and chaining said free indirect control blocks, said queue being controlled by a control block (FIQCB) which stores the addresses of the first and the last free indirect control blocks respectively in its head (H) field and its tail (T) field, (e) leasing a necessary number of free direct control blocks from said FDCBQ, each free DCB being associated to a free data buffer, in order to store the message received in said data buffers, (f) storing in said free direct control blocks the information relative to the associated data buffers which constitute the original message, (g) enqueueing said message in the message queue of a selected user by enqueueing the associated direct control blocks in said user queue, (h) leasing successively a free indirect control block from the FICBQ to store the information relative to the message to be multicast in each of said ICBs for each multicasting operations, (i) storing the information relative to the message to be multicast in each one of said free indirect control blocks, each ICB pointing to the direct control block corresponding to the first data buffer of the original message, each one of said ICBs representing a duplicated message, and (j) enqueueing said indirect control block in the message queue of each user to which the message has to be transmitted, for each one of the multicasting operations.

The apparatus of multicasting messages of the present invention to be used in connection with the above method in a communications system contains a plurality of control blocks which comprises:

a plurality of direct control blocks (DCB) wherein each said direct control block is associated to a data buffer the address of which has a predetermined relationship with the address of the corresponding direct control block.

a free direct control block queue (FDCBQ) which stores the addresses of all the free direct control blocks and chaining said free DCBs, said queue being controlled by a control block (FDQCB) which stores the addresses of the first and the last free direct control blocks respectively in its head (H) field and its tail (T) field, a plurality of indirect control blocks (ICB) to enable the multicast function to be performed message by message, and a free indirect control block queue (FICBQ) which stores the addresses of all the free indirect control blocks and chaining said free indirect control blocks, said queue being controlled by a control block (FIQCB) which stores the addresses of the first and the last free indirect control blocks respectively in its head (H) field and its tail (T) field.

BRIEF DESCRIPTION OF THE DRAWINGS

FIG. 1-B represents the LIM throughput as a function of the packet length of the basic LIM.

FIG. 3-A represents the different fields of the direct control block to be used according to the present invention.

FIG. 3-B represents the different fields of the indirect control block to be used according to the present invention.

FIG. 3-C gives an example of the direct and indirect control blocks use according to the present invention.

FIG. 4-B shows the indirect control block Lease mechanism performed by the DSI or the DCS.

FIG. 5-B shows the Enqueue mechanism of an indirect control block performed by the DSI or the DCS.

FIG. 5-C shows an example of a DCB message enqueued in the queue control block of a user A.

FIG. 7-B shows the Release mechanism of a direct control block performed by the DSI or the DCS.

FIG. 7-C shows the Release mechanism of an indirect control block performed by the DSI or the DCS.

FIG. 10-B represents the different fields of the extended indirect control block.

DETAILED DESCRIPTION OF THE INVENTION

Figure 1A:
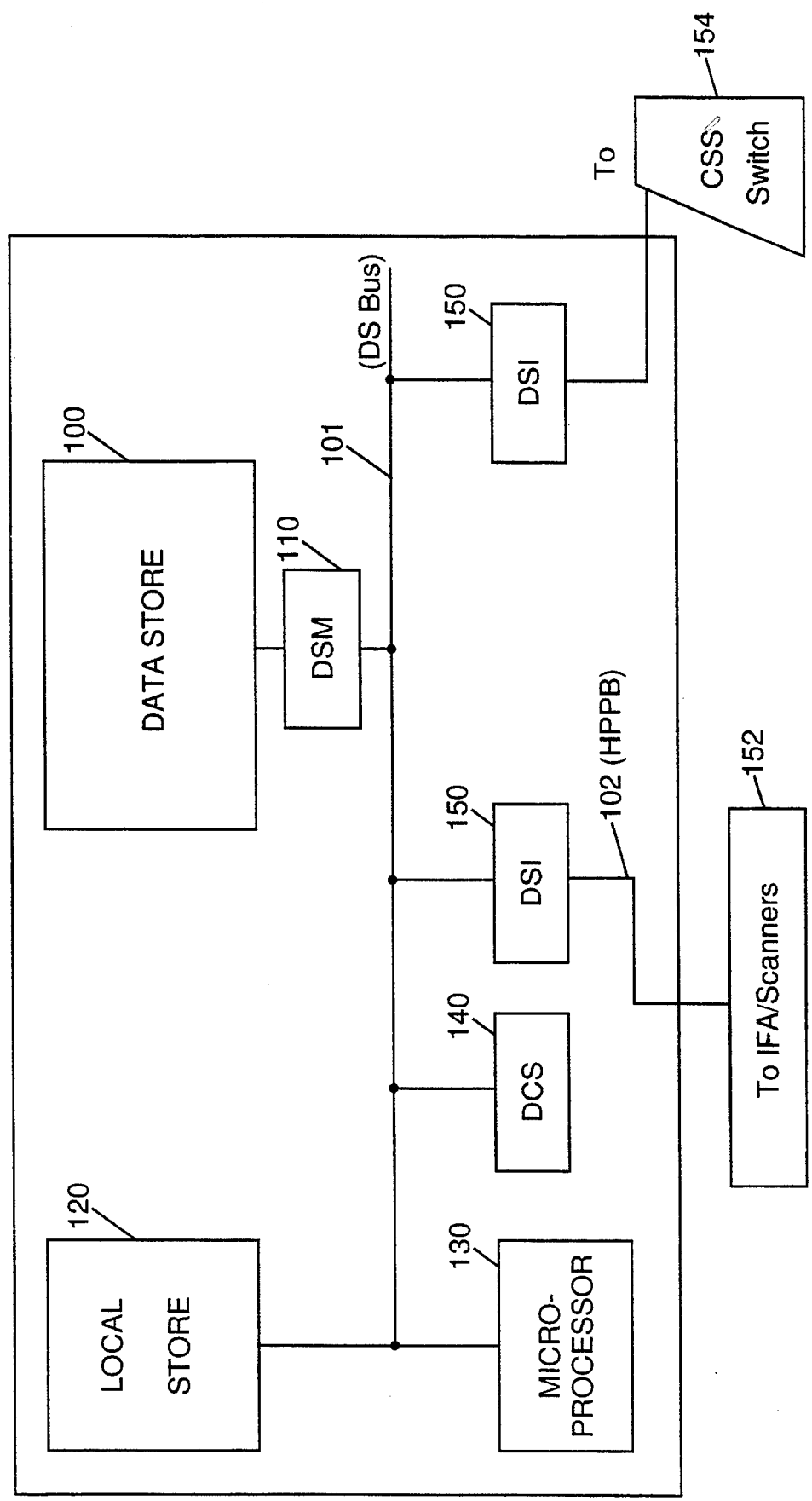
FIG. 1-A represents the LIM basic architecture in the prior art.
Figure 1B:
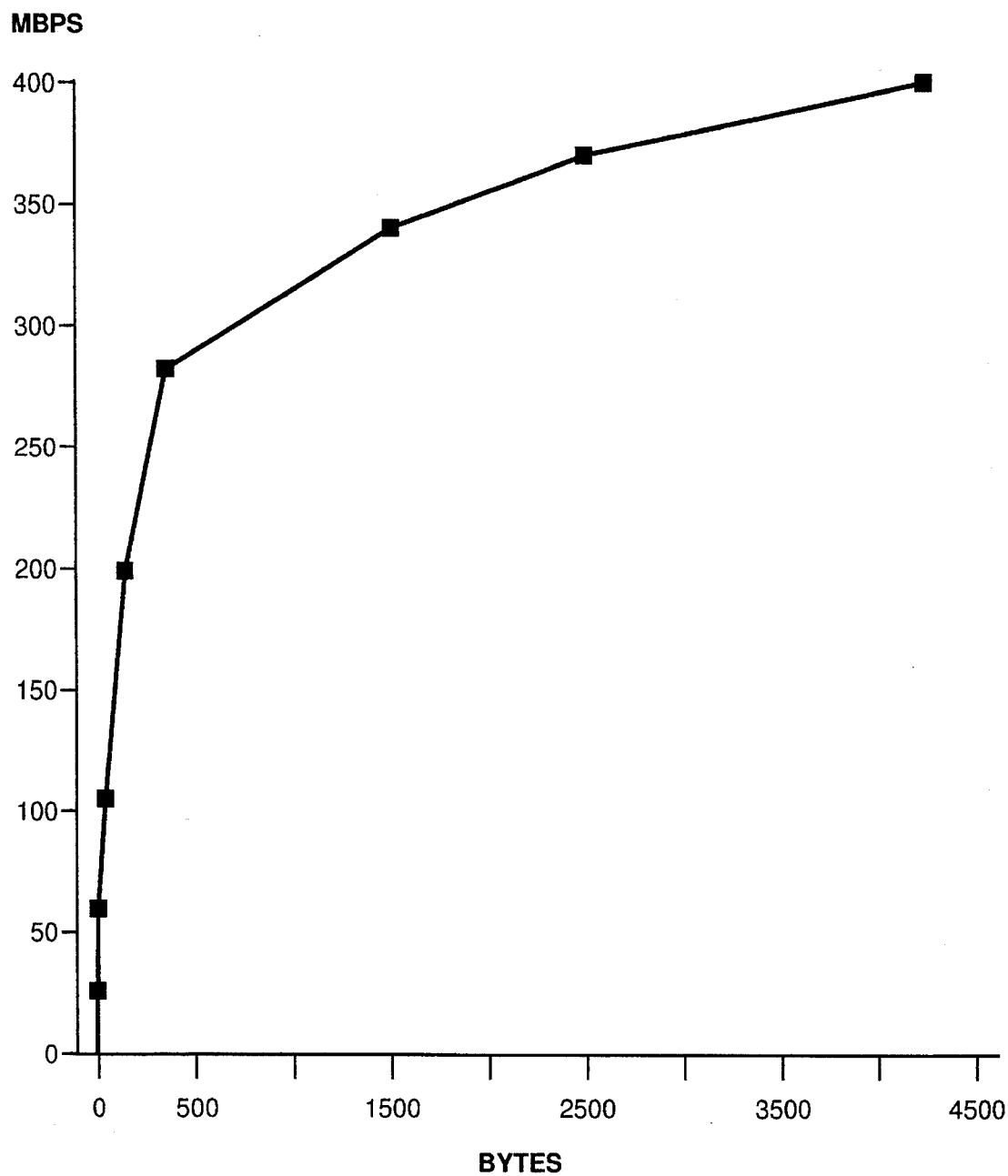
Figure 2:
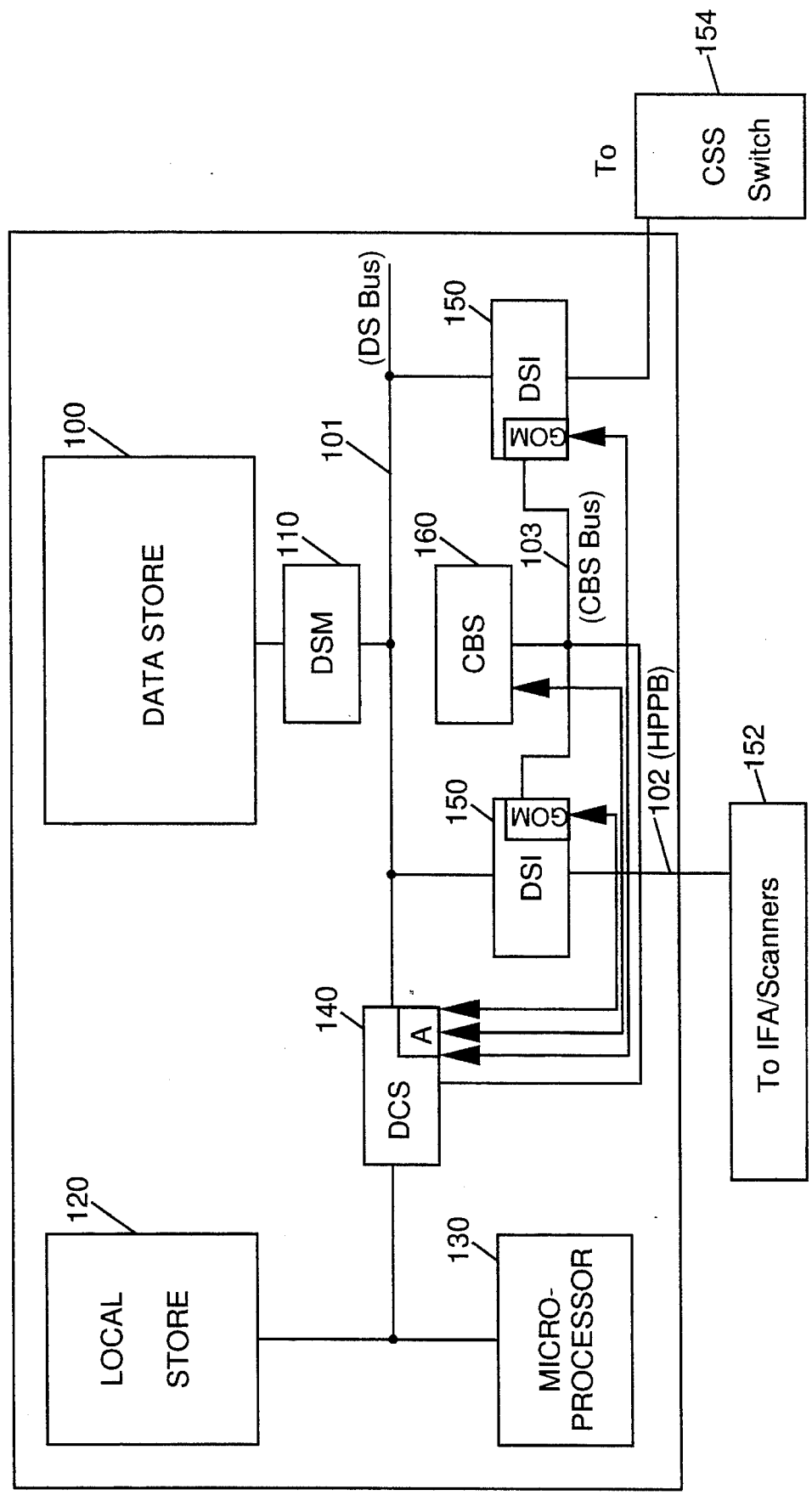
FIG. 2 represents the block diagram of a communication system incorporating the structure of the LIM preferred architecture according to the present invention.

FIG. 2 represents the block diagram of a communication system incorporating the structure of the Line Interface Module (LIM) preferred architecture according to the present invention.

Box 100 represents the data store memory which contains data buffers. This memory is shared by a plurality of users and is controlled by the data store manager (DSM) (110) which also arbitrates the access of the data store bus (DS bus) (101). The Data Store bus arbiter could be physically implemented in any other component attached or not attached to the DS Bus (independent function).

The communication system also comprises a microprocessor (130) having its own local storage (120) and its device communication server (DCS) (140). The DCS comprises a global order machine (GOM) which receives from the microprocessor the request to access the data store. The global order machine has the same function as described in detail in the patent application published EP 365 731. The DCS does not contain the Free Buffer Supplier machine which was used in the basic LIM to lease in advance a pool of buffers for the DSIs. The fast lease operation of the present invention makes the Free Buffer Supplier useless.

This DCS is connected to the DSM and to every data store interface (DSI) (150) through the DS bus. This DS bus may also be used to connect one LIM to another LIM as is represented in the figure (via the CSS switch).

Each DSI is connected to different adapters or scanners (152) through a high performance parallel bus HPPB. It can also be connected to a communication subsystem switch (154). Each adapter is connected to a plurality of users which share the data store (100). In order not to jam the data store bus, a separate control block store CBS (160) is attached to every DSI of the same LIM and to the DCS of the microprocessor via a CBS bus (103). Hence, an arbiter is included in the DCS (or else where) in order to control the request for use of the CBS bus. The access to the CBS bus has to respect a predetermined priority. The different DSIs have the priority on the DCS for any request of a primitive operation (Lease, Enqueue, Dequeue, and Release).

The DSI used in the present invention comprises the same components as is described in the document EP 365 731, and also a global order machine which performs exactly the same functions as for the microprocessor. Therefore, each DSI and DCS can read and write in the CBS.

While the data are still enqueued in the data store, the CBS is used to store the control structures of these queues. This enables to decreasing the load on the DS bus, since all the control traffic does not transit anymore on this bus. These control structures which are of two kinds of control blocks, direct and indirect control blocks, will be described more in detail latter on.

A variable number of data buffers are chained to be able to store messages of different lengths, building by the way the queues of the direct and/or indirect control blocks. The buffer chaining is identical to the one described in the patent application EP 365 731. A message may be contained in several data buffers. A direct control block (DCB) of the CBS is mapped to each data buffer of the data store. In addition to the DCBs a pool of Indirect Control Blocks (ICB) is provided for implementing the multicast function. The DCBs and the ICBs have the same structure except that the ICBs have no associated data buffer.

Figure 3:
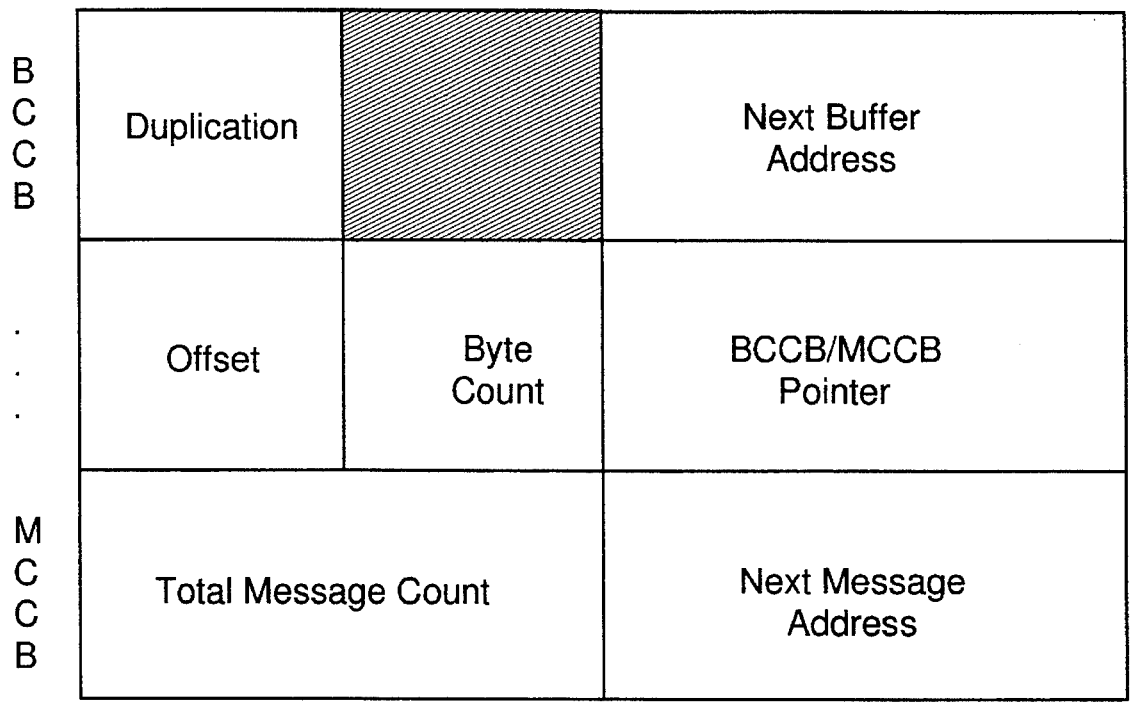
FIG. 3 represents the different fields of a direct control block or indirect control block.
Figure 3A:
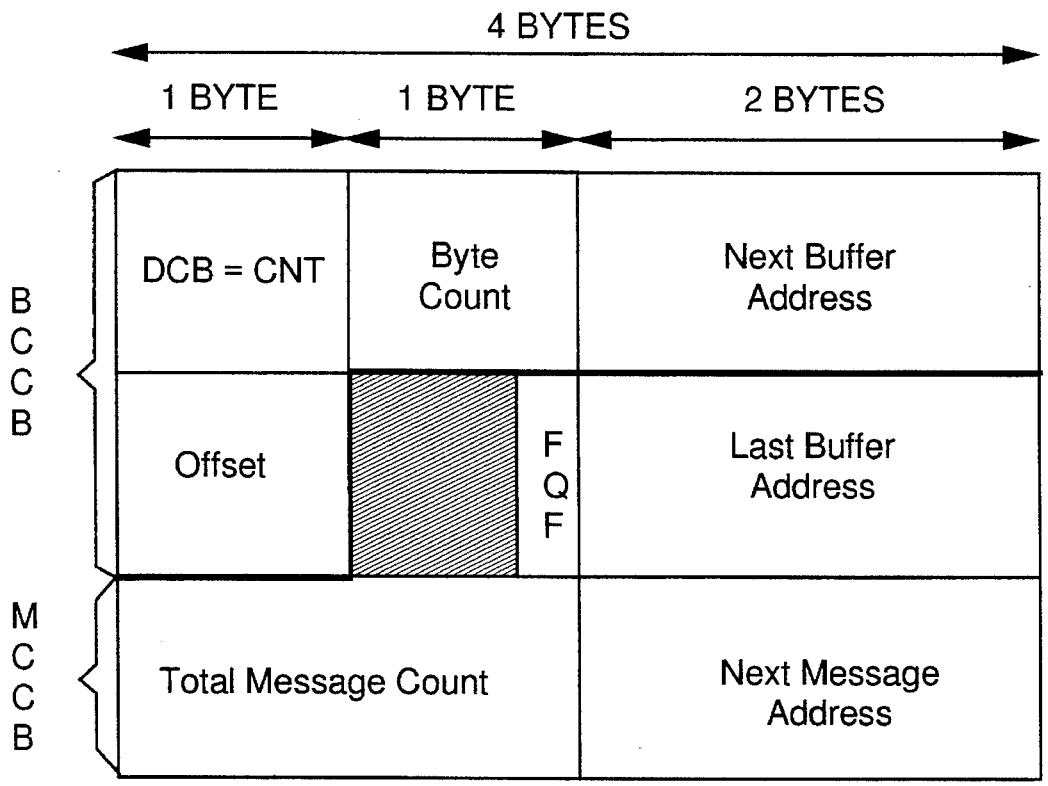
Figure 3B:
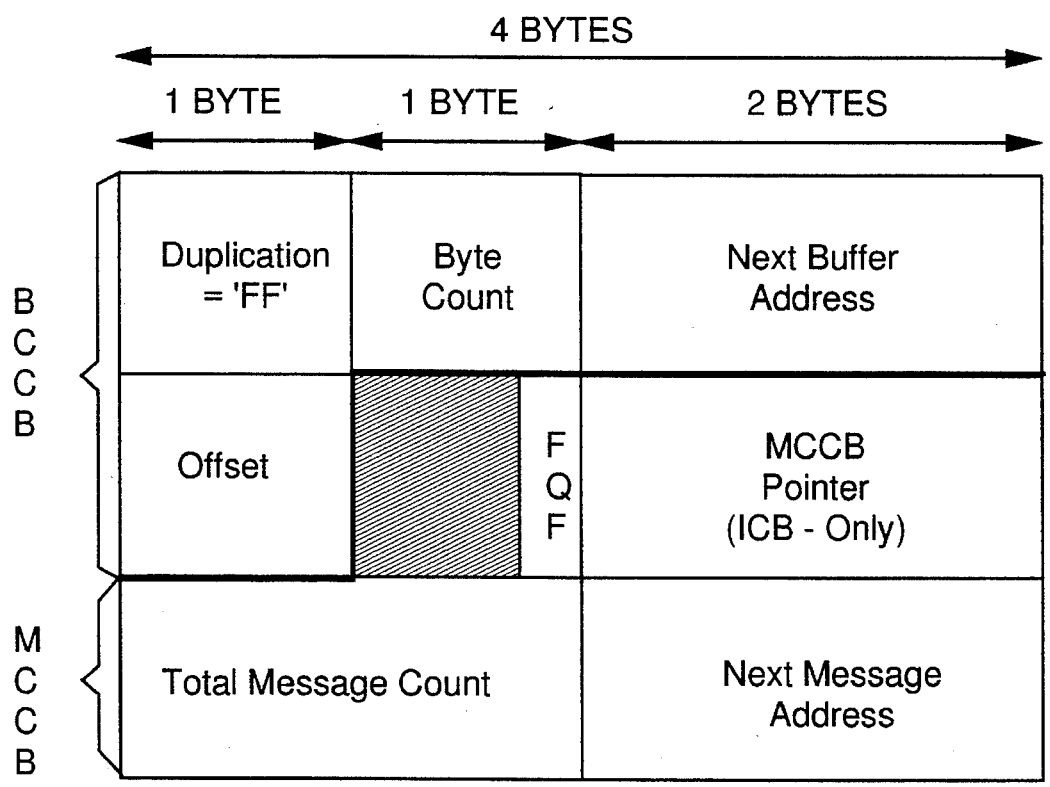
Figure 3C:
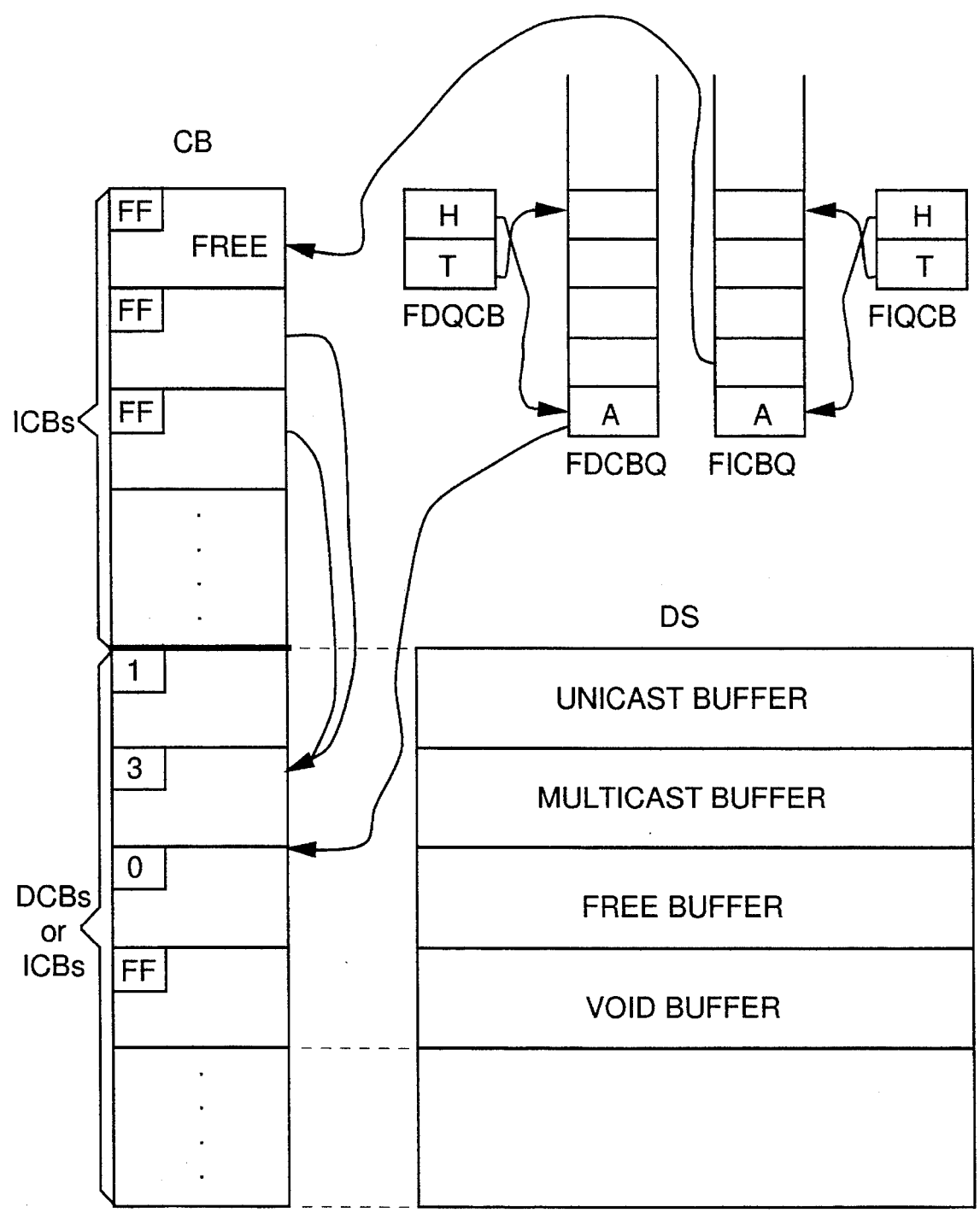

FIG. 3 shows a graphical representation for the format or structure of a direct control block (DCB) or indirect control block (ICB). The structure includes a duplication field, a next buffer address field, an offset field, a byte count field, a BCCB/MCCB field, a total message count field and a next message address field. A more detailed description and relevancy of each field is set forth below.

FIG. 3-A shows the different fields that a direct control block contains. It comprises the buffer chaining control block BCCB which contains information relating to the buffer chaining within the message, and the message chaining control block MCCB which contains information relating to the message chaining within the queue of messages dedicated to a user.

Figure 7A:
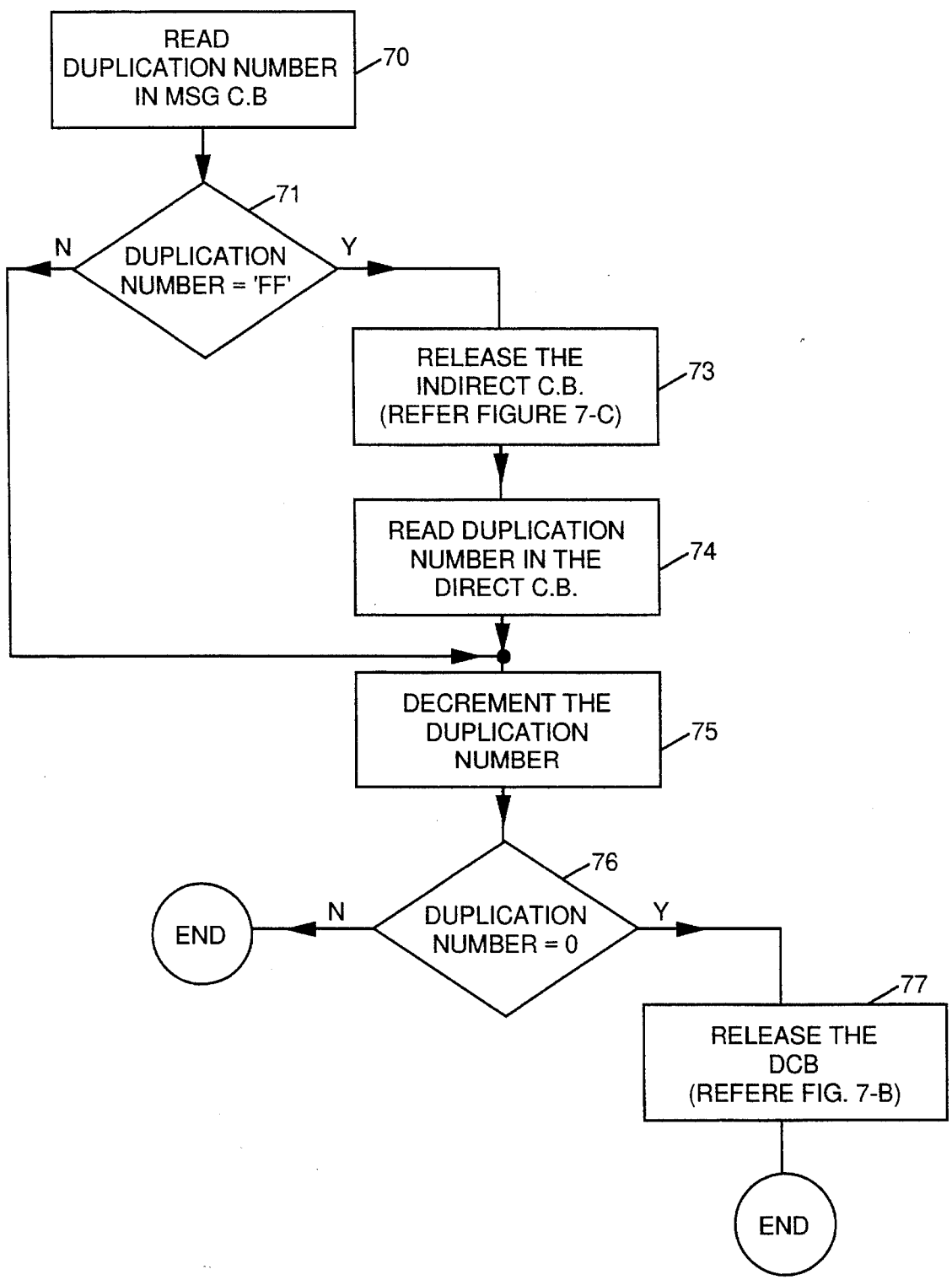
FIG. 7-A shows the Release mechanism which is performed by the DSI or the DCS to have access to the CBS according to the present invention.
Figure 7B:
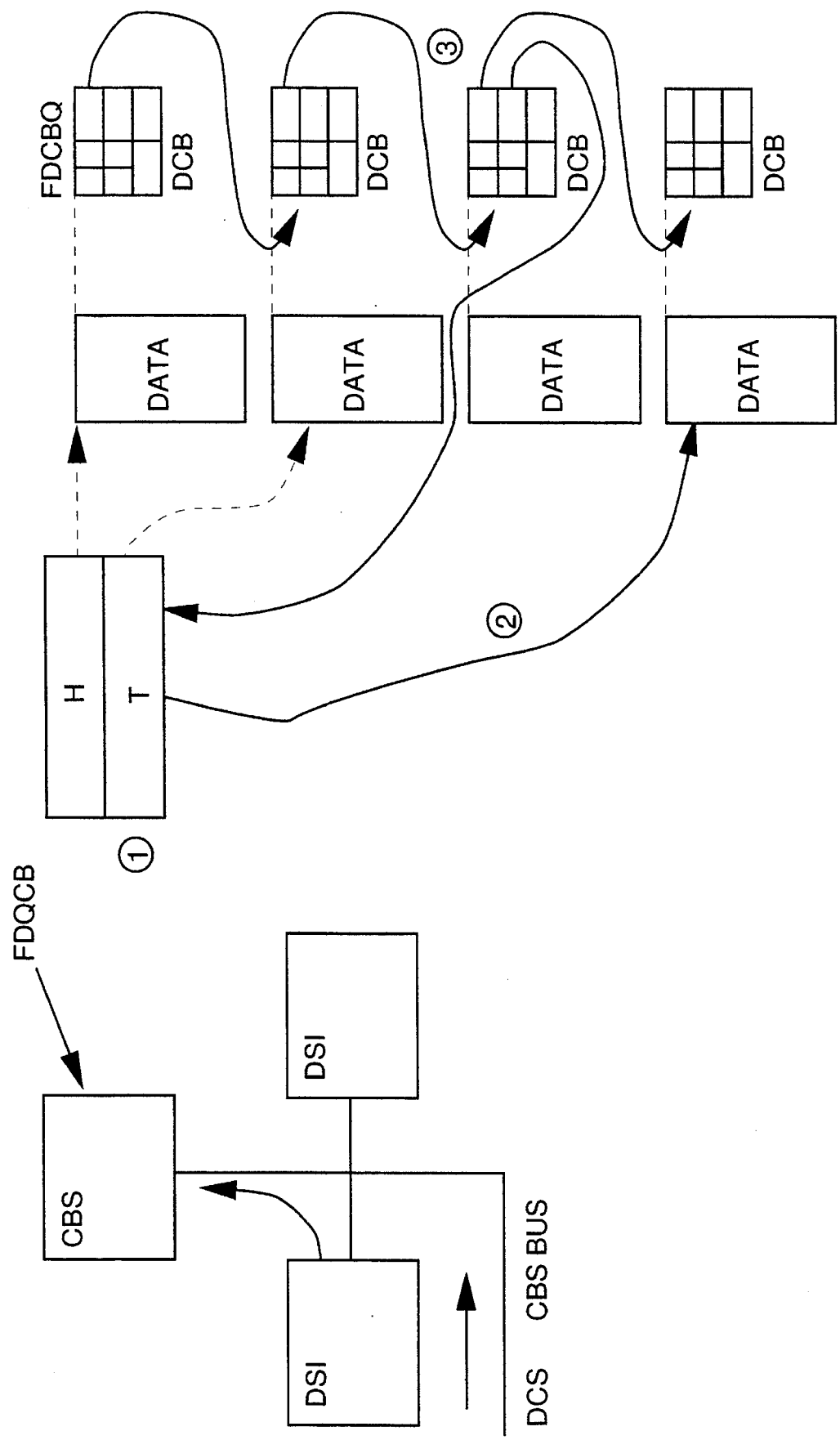
Figure 7C:
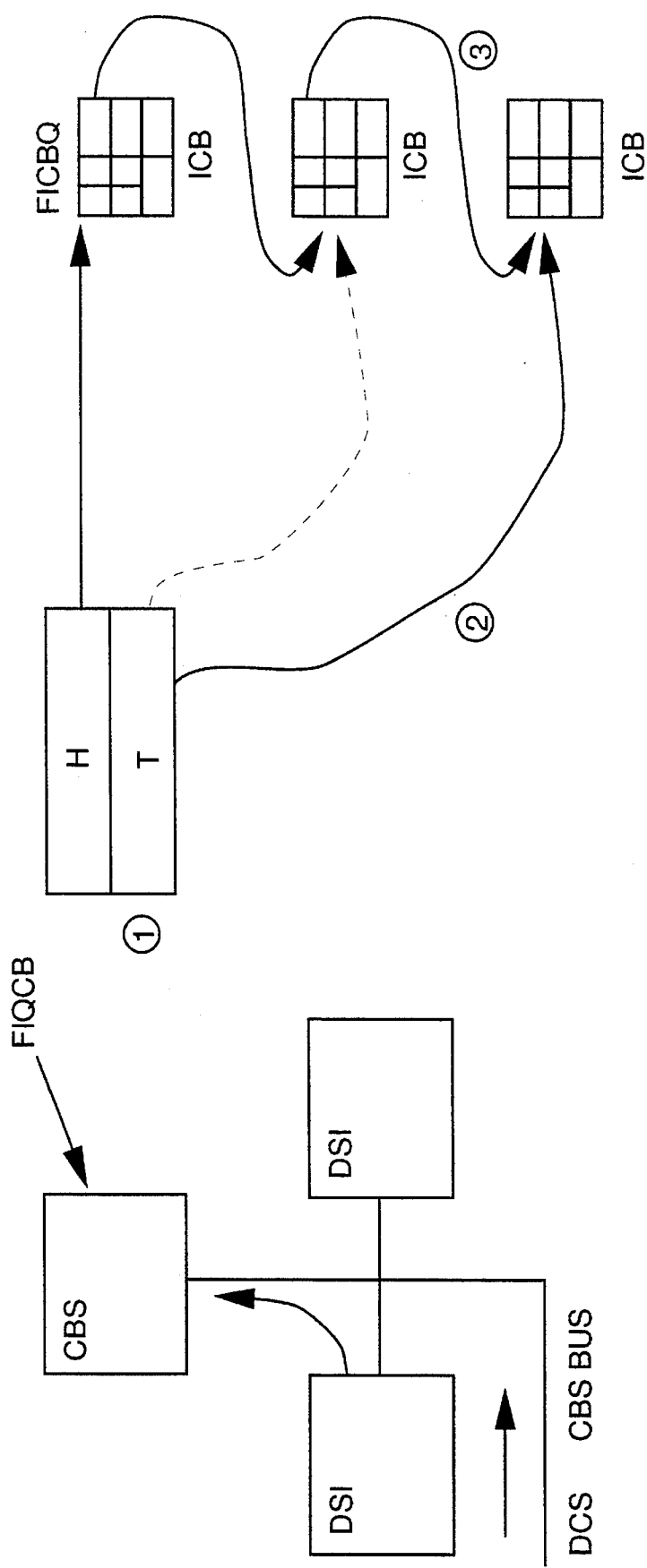

More in detail, the BCCB contains at least:

- a duplication field of 1 byte which indicates the value of the duplication number of the data implicitly referenced by the control block,
- a byte count field of 1 byte which gives the number of bytes used in that buffer,
- a next buffer address field of 2 bytes, in the case of the DCBs, this field is used to chain the DCBs—then their associated data buffers—in a user queue (then the chained buffers form a message) or in the Free DCB queue (then all the free buffers are chained in this queue),
- an offset field of 1 byte which indicates the beginning of the data in that buffer,
- a Free Queue Flag (FQF) field of 1 bit which indicates that the chain of buffers forming a message is in the Free queue, when it is equal to 1,
- a last buffer address field of 2 bytes which gives the address of the last DCB (and then the data buffer) of a message, the use of this field is necessary for the DCB Release operation as is shown in FIG. 7-B. Indeed, this field enables release in a single operation the entire chained control blocks instead of releasing the data buffer one by one,
- a total message count field of 2 bytes which gives the number of bytes used in that message, and
- a next message address field of 2 bytes.

FIG. 3-B shows the different fields that a indirect control block contains. It also comprises the buffer chaining control block BCCB which contains information relating to the buffer chaining within the message, and the message chaining control block MCCB which contains information relating to the message chaining within the queue of messages dedicated to a user.

More in detail, the ICB uses all the fields of the DCB except that:

- the duplication field for the indirect control block stores the code 'FF' instead of the count of the number of duplication of the data,
- the next buffer address is only used to enqueue the indirect control blocks in the Free Indirect Control Block Queue quoted latter in the FIG. 3-C, whereas when the ICB is used to point to a DCB this field is not empty, and that the last buffer address field is replaced by:

- a MCCB pointer field of 2 bytes which is used only for indirect message control block. It enables pointing to the address of the direct message control block implicitly bound to the data buffer.

FIG. 3-C gives an example of the use of the direct and indirect control blocks which are stored in the CBS.

The control blocks are divided into two distinct parts which are the indirect and the direct control blocks. Each direct control block (DCB) is mapped with a unique data buffer as is represented in the figure by darts, whereas, the indirect control blocks (ICB) are only required to point to the associated DCB in case there are duplications of the data messages. The indirect control block is not mapped to a data buffer. The non-mapping is one of the advantages of the present invention.

Each ICB is identified by the code 'FF' in the duplication field and the free ICBs are gathered in a free indirect control block queue (FICBQ). The free direct control block queue (FDCBQ) gathers all the free DCBs whose duplication fields store the number '0', as is represented in the figure.

The FDCBQ is controlled by a control block called FDQCB which contains two fields which are the 'Head' and the 'Tail'. The head indicates the first direct control block of the FDCBQ to be dequeued at the request of a user, whereas the tail indicates the last direct control block of the FDCBQ, as is shown in the figure. In the same way, the FICBQ is controlled by a control block called EIQCB have the same structure as the FDQCB.

The duplication field is updated to '1' in case a unicast of the data buffer or the message is required. When a message or a data buffer has to be multicast to a plurality of users, the duplication number is incremented as is shown in the figure. The number '3' in that field indicates that two indirect control blocks point to that DCB.

In case the number of messages or data buffers are to become numerous, the number of ICBs will grow, which may empty the FICBQ, the DCBs may then be used as an ICB by storing the code 'FF' in the corresponding DCB and voiding the associated data buffer. This solution is sometimes useful, but it wastes the memory space because of the void buffers.

The detailed operation of each primitive (Lease, Enqueue, Dequeue and Release) is given in the next section along with an assessment of the global performance which has been much improved.

Figure 4A:
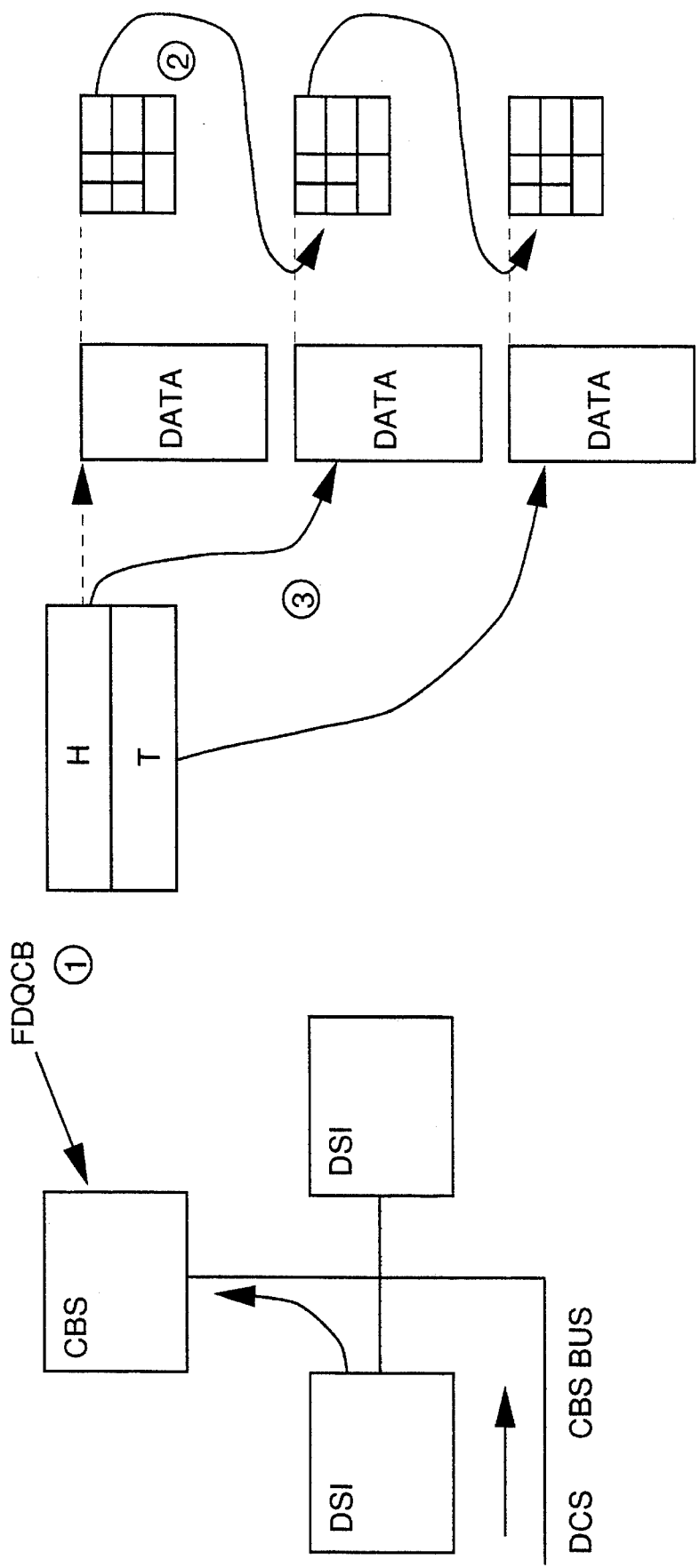
FIG. 4-A shows the direct control block Lease mechanism which is performed by the DSI or the DCS which have access to the CBS according to the present invention.
Figure 4B:
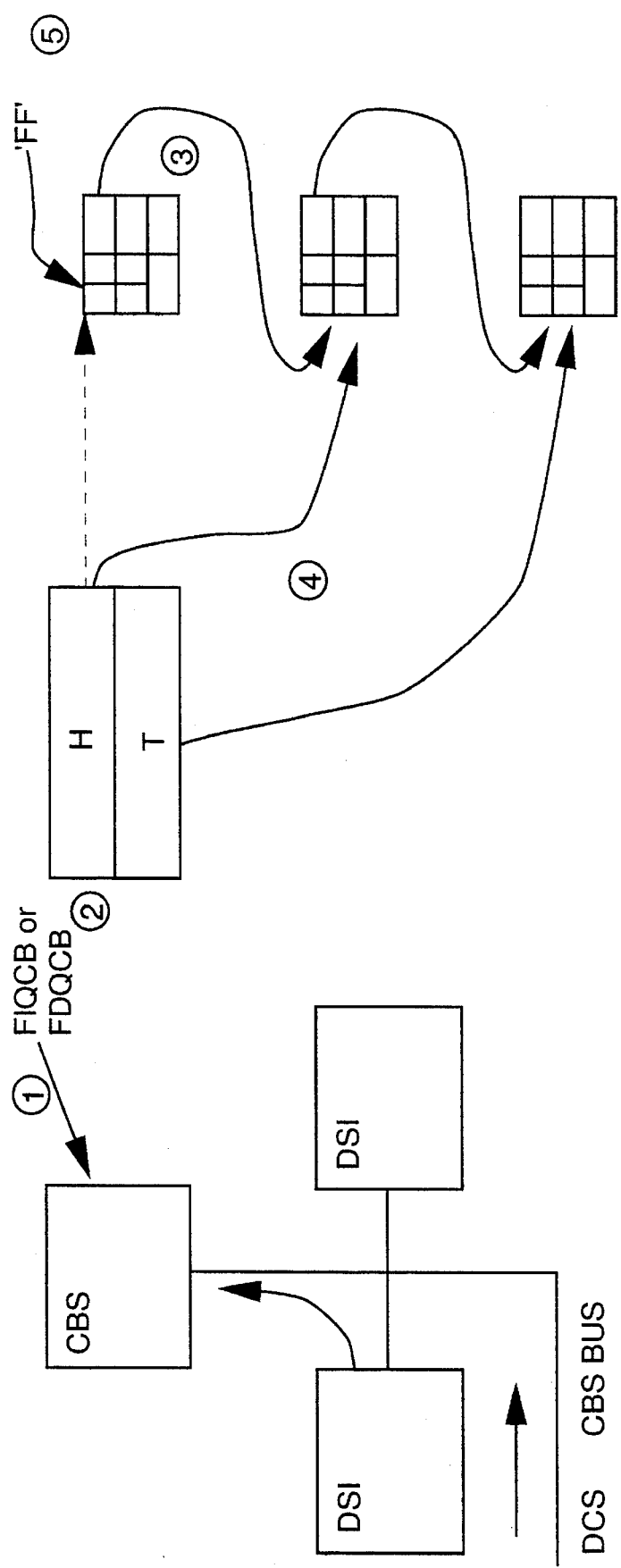

FIGS. 4-A and 4-B represent the Lease operation which is performed by the DSI which has access to the CBS thanks to its own global order machine which enables reading or writing the direct and indirect control blocks. This primitive operation is requested by one of the users connected to the DSI, and it may be used as well for the direct as the indirect control blocks except that the direct and indirect control blocks have to be leased respectively from the free direct control blocks queue (FDCBQ) and the free indirect control blocks queue (FICBQ).

However, a difference remains in that the Lease operation of a direct control block provides a buffer of 256 bytes for example, to be removed from the free direct control block queue and allocated to the user that has requested it, in order to write data inside this newly acquired buffer. The Lease operation of an indirect control block only remove from the free indirect control block queue an indirect control block. None of the indirect control blocks is associated to a data buffer, as is said before.

FIG. 4-A describes the three successive operations of the direct control block Lease operation which may be performed by the DSI or by the DCS of the microprocessor and more precisely by its GOM.

It comprises the following steps:

- step 1: the DSI reads the head 'H' of the free direct control block queue in the 'Head' field of the FDCBQ control block also called 'FDQCB' stored in the CBS. This head indicates the address of the first free control block which is mapped to a data buffer of the data store shown in the figure,

- step 2: thanks to this first control block, the DSI may read the address of the next direct control block also mapped to a corresponding data buffer as is shown in the figure, and

- step 3: the DSI writes the address of this second direct control block in the Head field of the FDQCB, leasing therefore the first control block and its corresponding data buffer to the user who has requested this primitive operation.

Therefore, the Lease operation of a direct control block will require only a total of 3 cycle-times in this preferred embodiment because the DSIs perform directly the read and write operations thanks to their own global order machines.

The atomicity of the three primitive operations required that they be performed successively in order to avoid that the primitive operations be interleaved which may create confusions. After the Lease operation is completely performed, the arbiter grants the access of the CBS to another DSI or to the DCS of the microprocessor. This atomicity is also applicable for the three other primitive operations: Enqueue, Dequeue and Release, as well for the direct control blocks as for the indirect control blocks.

FIG. 4-B describes the five successive operations of the indirect control block Lease operation which may be performed by the DSI or by the DCS of the microprocessor and more precisely by its GOM.

It comprises the following steps:

step 1: the DSI determines from which queue (FICBQ or FDCBQ) the control block will be dequeued. If the FICBQ is not empty, then the control block will be dequeued from the FICBQ. If the FICBQ is empty, then the control block will be dequeued from the FDCBQ.

step 2: the DSI reads the 'Head' field of the FICBQ control block also called 'FIQCB' (or the 'Head' field of the FDCBQ control block 'FDQCB') stored in the CBS. This head indicates the address of the first free indirect or direct control block.

step 3: thanks to this first control block, the DSI may read the address of the next direct or indirect control block, step 4: the DSI writes the address of this second direct or indirect control block in the Head field of the FIQCB (or FDQCB), leasing therefore the first control block to the user that has requested this primitive operation, and step 5: the DSI writes the code 'FF' in the duplication field of the leased control block (whether it has been dequeued from the FICBQ or FDCBQ) to identify it as an indirect control block.

Therefore, the Lease operation of an indirect control block will require a total of 5 cycle-times time in this preferred embodiment.

Figure 5A:
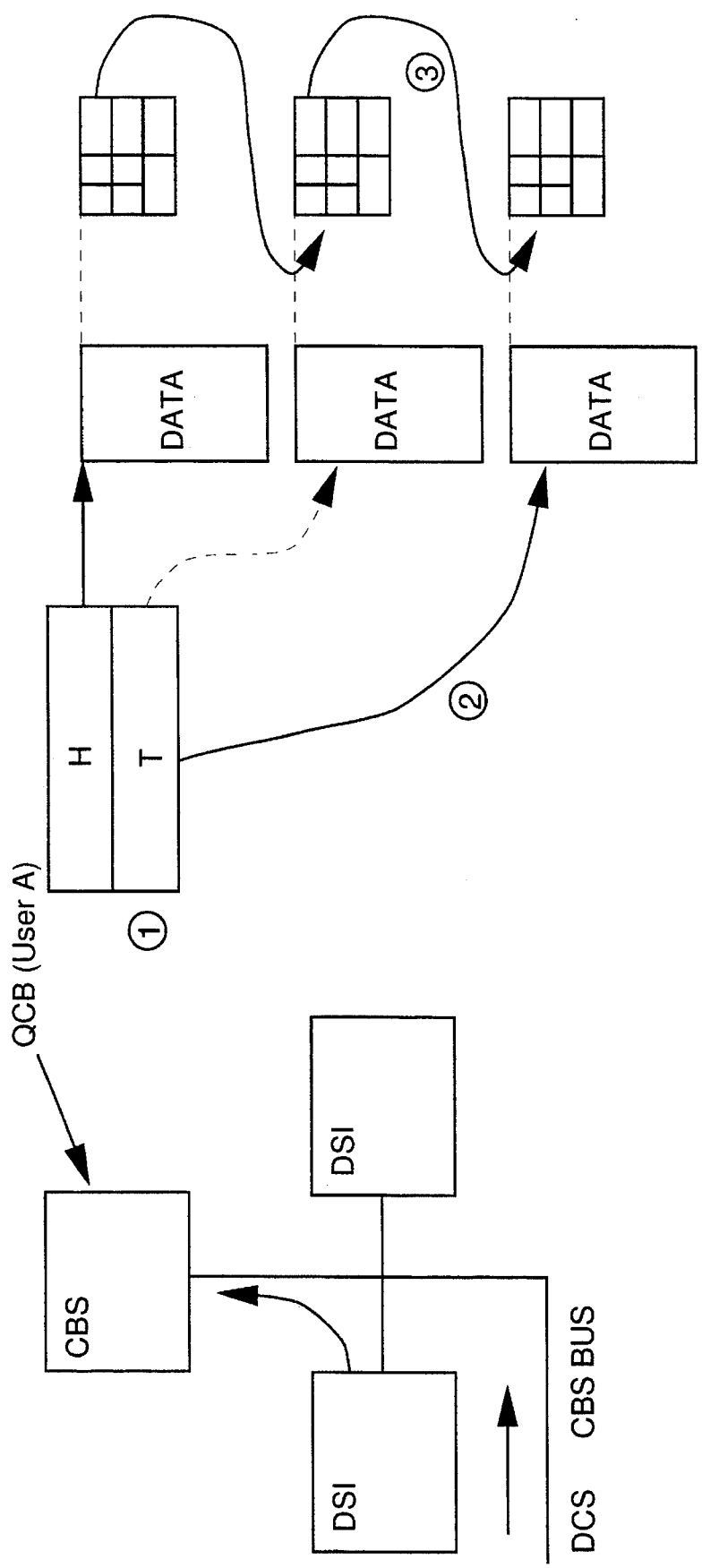
FIG. 5-A shows the direct control blocks Enqueue mechanism performed by the DSI or the DCS.
Figure 5B:
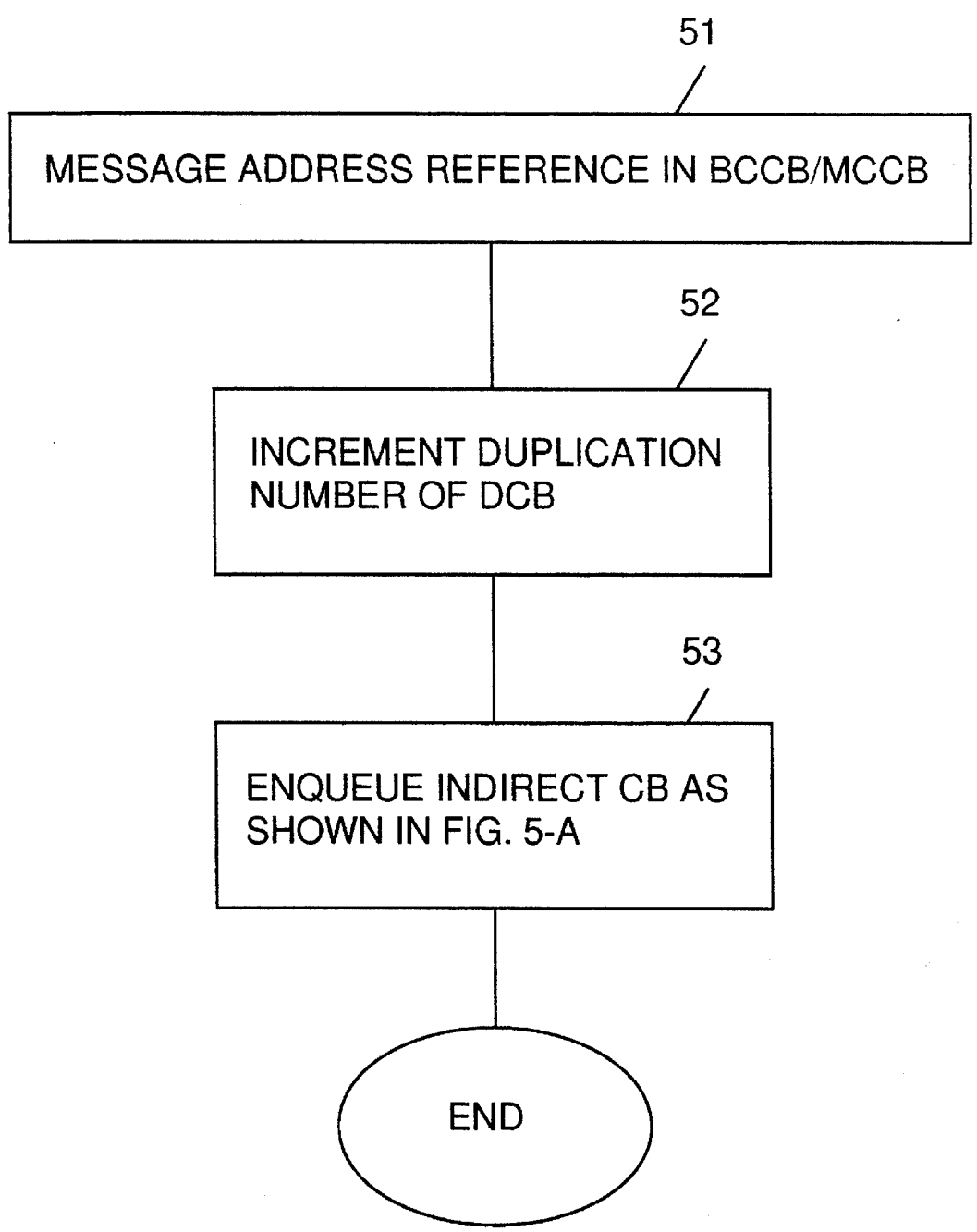
Figure 5C:
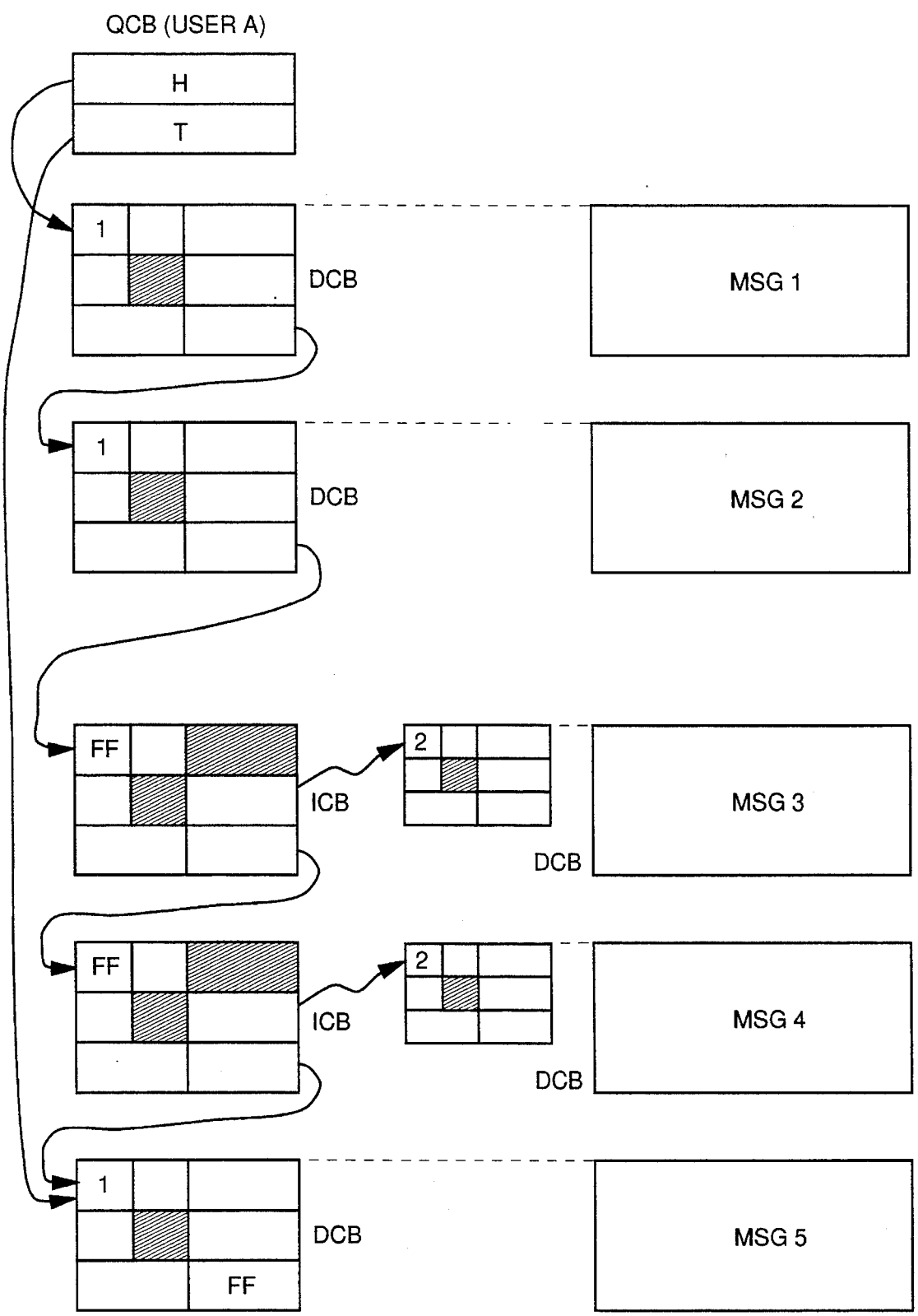

FIG. 5-A represents the Enqueue operation which may be performed by any one of the DSIs that has access to the CBS thanks to its own global order machine. The global order enables to reading or writing directly the control blocks in said CBS. This primitive may be requested by one of the users connected to the DSI.

This Enqueue operation may also be performed by the DCS of the microprocessor and more precisely by its GOM.

This operation provides a data buffer of 256 bytes or a set of chained data buffers forming a message to be put into a queue belonging to the user that has requested it. To each data buffer corresponds a direct control block, and instead of manipulating the data buffer, the DSI will only manipulate the associated control blocks, direct and indirect, which is more flexible.

The three logical steps composing the enqueue primitive are explicitly shown in this FIG. 5-A and are as follows:

step 1: the DSI reads the tail field of the queue control block of the user that has requested this operation in the CBS. This tail field indicates the address of the last buffer control block which is mapped to a data buffer of the data store if it is a direct control block, step 2: the DSI writes in this tail field the address of the data buffer or the set of chained data buffers to be enqueued in this queue control block, and step 3: the DSI writes finally the address of the new message or the new data buffer in the previous buffer control block inserting, therefore the new data buffer or the new set of data buffers at the queue of all the messages which are destined to the corresponding user.

The Enqueue primitive also requires a total of 3 cycles time, and the three steps have to be performed successively.

FIG. 5-B illustrates the Enqueue operation of a duplication of a message represented by the indirect control blocks.

This Enqueue operation may also be performed by any one of the DSIs that has access to the CBS thanks to its own global order machine.

At step 51, the DSI stores in the field BCCB/MCCB pointer the reference of the message address which corresponds to the direct control block.

At step 52, the duplication number is incremented in the associated DCB, in order to indicate that there is another indirect control block which is referenced to the same message mapped to unique direct control block.

Finally, at step 53, the DSI may enqueue the indirect control block in the same way as the direct control block which has been described in the FIG. 5-A.

Therefore, the indirect control block Enqueue operation required a total of 5 cycle-times, and these five steps have to be performed successively.

FIG. 5-C gives an example of a message enqueued in the queue control block of the user A.

The head field of the QCB dedicated to the user A indicates the address of the first message mapped to the a first direct control block whose next message address field indicates the second DCB of the user A mapped to the second message. The duplication field of both direct control blocks stores the number '1', which means that message 1 and message 2 were not duplicated to any other user.

Besides, the second DCB points to an indirect control block identified by the code 'FF' in the duplication field. This first ICB has the MCCB pointer which points to a direct control block mapped associated to a third message. The duplication number of this indirect control block has been incremented to the number 2 to indicate that there is no other duplication except the original control block which is represented by the DCB and said indirect control block.

In this example, the next message address field of this first ICB points to the second ICB. This second ICB enables access to the forth message, and its next message address indicates the last message enqueued in the user A QCB whose tail field also stores said last message address. The code 'EF' in the next message address field enables to indicate that this message is the last one.

Figure 6:
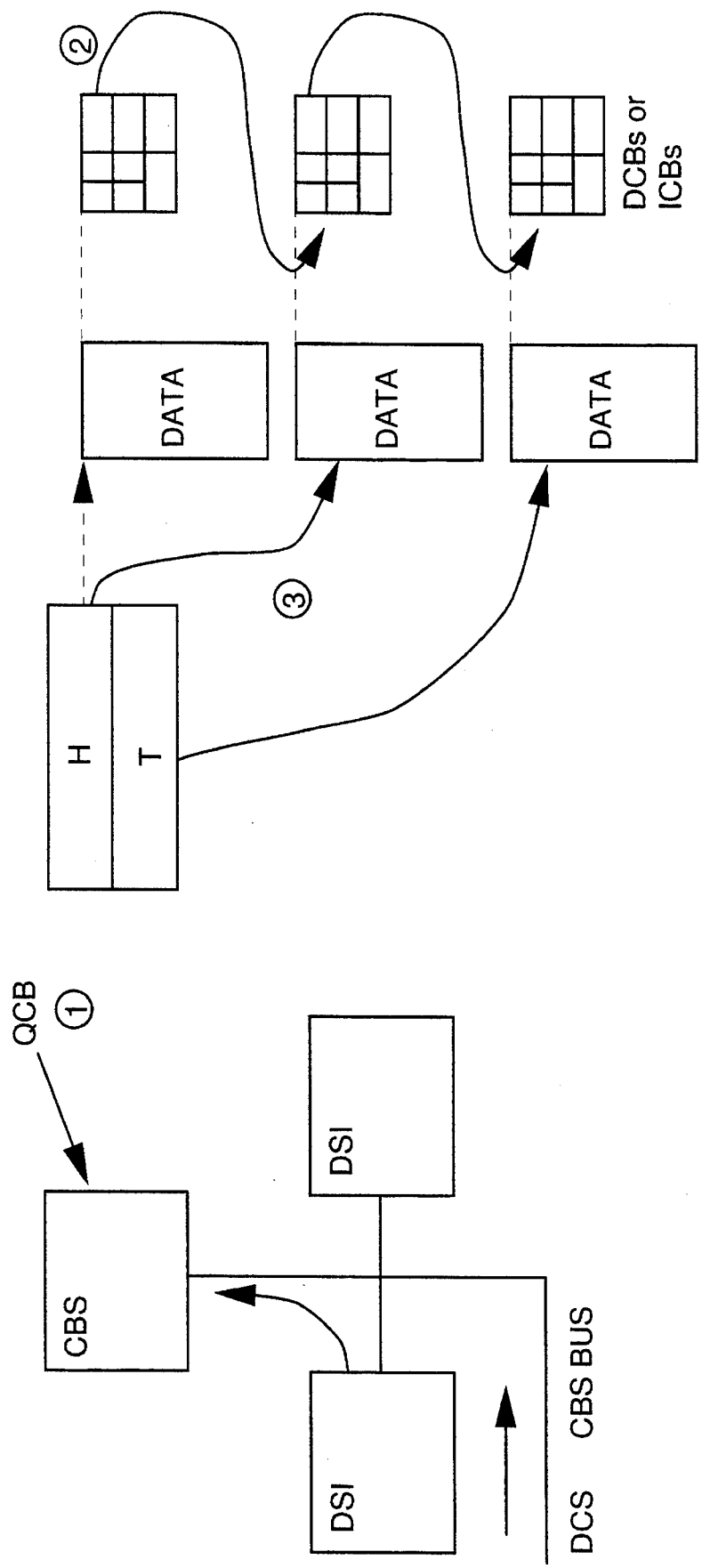
FIG. 6 shows the direct and indirect control blocks Dequeue mechanism performed by the DSI or the DCS.

FIG. 6 represents the Dequeue primitive which may be performed by any one of the DSIs or the microprocessor that has access to the CBS thanks to its own global order machine. The GOM enables to reading or writing directly the control blocks in said CBS after requesting the CBS bus grant to the arbiter located in the DCS. This primitive may be requested by one of the users connected to the DSI.

This Dequeue operation enables a user to take a set of data buffers or message from one of its queues in order to process said message. Said data buffers may be, for example, transferred to another user or multicast to many other users by only manipulating the direct or indirect control blocks stored in the CBS. The data buffers are processed in the same way as in the case of FIFO.

This direct or indirect control block Dequeue primitive comprises the three following steps:

step 1: the DSI reads the head field of the queue control block stored in the CBS. This field indicates the address of the first direct or indirect control block. In case it is a direct control block, it is mapped to a data buffer contained in the data store. This address will be subsequently be used by the entity processing the message as a pointer to the message, step 2: thanks to this first control block, the DSI may read the next message address in the message control block, and step 3: the DSI writes the address of said next message in the head field of the queue control block of the corresponding user, releasing therefore the message or the set of chained data buffers from the queue of the user that has requested this Dequeue primitive.

The Dequeue primitive also requires 3 cycles time for the three steps of read and write which have to be performed successively.

FIG. 7-A represents the direct or indirect control block Release message primitive which may be performed by any one of the DSIs or the microprocessor that has access to the CBS. The performance is done by their respective own global order machine. As previously said, the global order machine enables to reading or writing directly the control blocks in said CBS after requesting the CBS bus grant to the arbiter located in the DCS. This primitive may be requested by one of the users connected to the DSI.

The Release message operation directly places the complete chain of data buffers corresponding to the given message inside the free queue, and not buffer after buffer as previously done. As a matter of fact, only the control blocks are manipulated, and this Release operation is similar to the Enqueue operation except that it concerns the free direct control block queue or the free indirect control block queue instead of the queue control block of a determined user.

Besides, in order to verify the integrity of the free queue, the message control block will be flagged with "Free chain information" by setting to 1 the Free Queue Flag (FQF field of the MCCB). At first enqueue, this flagged information will be erased and modified by the queue information.

The Release message primitive uses the 'Release DCB' or the 'Release ICB' elementary operations described in FIG. 7-B and FIG. 7-C.

FIG. 7-A represents the main flow-chart of the Release message mechanism.

At step 70, the DSI reads the duplication field in the message control block to check its value at step 71.

If it does not store the value 'FF', it means that it is a DCB, then the process jumps to step step 75.

Otherwise, it means that it is an ICB, then the process continues. At step 73, the ICB chain, composed of a single control block or a plurality of chained control blocks, is released as described in FIG. 7-C.

At step 74, the DSI reads the MCCB pointer field of the ICB to get the address of the associated DCB. In this DCB, the DSI reads the duplication field.

At step 75, the DSI decrements the duplication number, and its value is compared to 0 at step 76.

If the value is different from 0, then the process stops because there is still at least one user queue containing the message.

If the value is equal to 0, the DCB chain is released as described in FIG. 7-B because it means that the DCB is the last one and the data buffer will no longer be used.

FIG. 7-B shows the DCB Release operation which comprises 3 logical steps which must be performed successively:

step 1: the DSI reads the tail of the EDCBQ control block (EDQCB). This tail field indicates the address of the last free direct control block, step 2: the DSI writes in this tail field the address of the last DCB of said set of DCBs to be enqueued in the FDCBQ, this address is found in the last buffer address field of the MCCB, i.e. in the first DCB of the message, and step 3: the DSI writes finally the address of the new message in the previous direct control block inserting therefore the new set of DCBs at the queue of the FDCBQ.

FIG. 7-C shows the ICB Release operation which comprises 3 logical steps which must be performed successively:

step 1: the DSI reads the tail of the FICBQ control block (FIQCB). This tail field indicates the address of the last indirect control block, step 2: the DSI writes in this tail field the address of the first ICB of said set of ICBs to be enqueued in the FICBQ, and step 3: the DSI writes finally the address of the new message in the previous indirect control block inserting therefore the new set of ICBs at the queue of the FICBQ.

The total number of cycle times required for the Release operation depends on the case in which the direct or the indirect control blocks are to be released.

Figure 8:
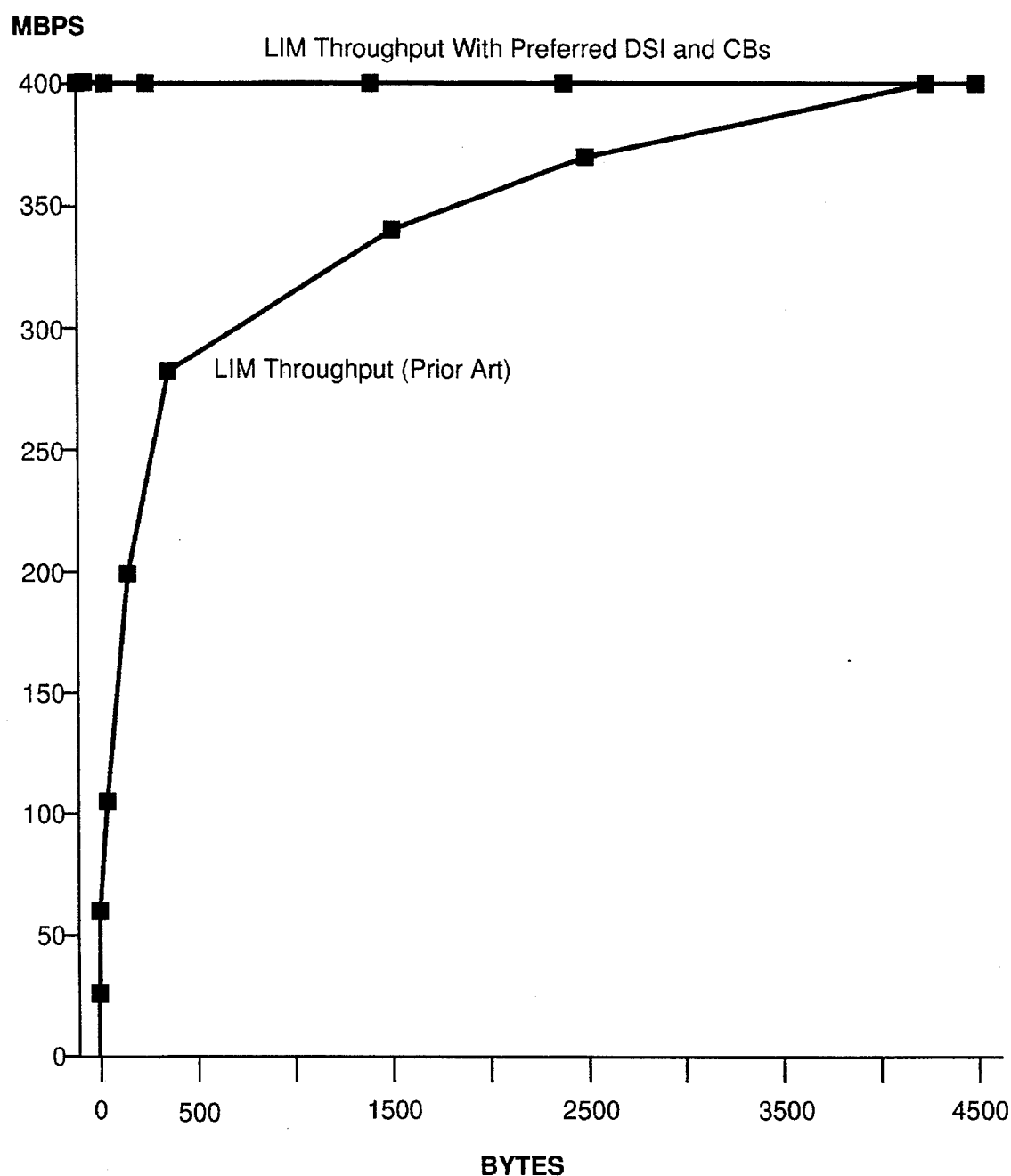
FIG. 8 represents the LIM throughput (Mbps) of the present invention as a function of the packet length (bytes) in comparison with the LIM throughput of the prior art.

FIG. 8 shows a diagram of the LIM throughput (Mbps) as a function of the packet length (bytes). In this figure, we may notice that the LIM throughput with the modified structure grows faster at short packet length to reach the maximum (400 Mbps) at 20-byte packets length. Assuming a CBS bus cycle time of 40 nanoseconds, one gets 2.2 Mega-packets per second. This enables to handle a 210 Mbps media when the packet length is 12-byte packets. In this way, the implementation of this LIM will support any type of traffic around T3 rate (45 Mbps) with a satisfactory media utilization and above T3 to reach the OC3 rate (optical carrier) which is three times the T3 rate (155 Mbps).

Figure 9:
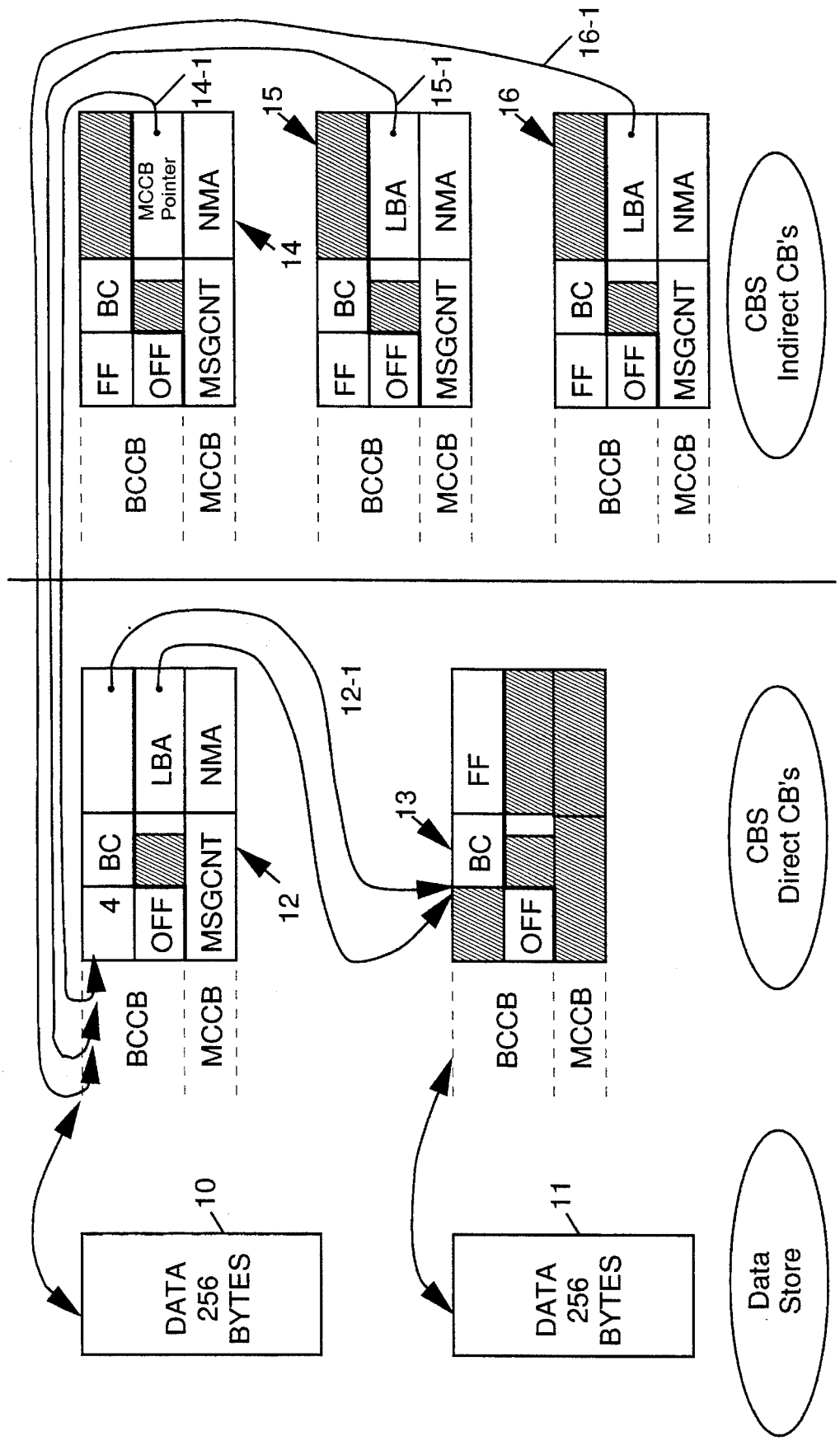
FIG. 9 shows an example of the multicast operation using the direct and indirect control blocks.

FIG. 9 illustrates an example of the multicast processing. In the present case, 2 data buffers (10) and (11) which are stored in the data store (100) represent a message of a user. The data buffer (10) and (11) are respectively associated to the direct control blocks (12) and (13) having the template as previously described. The next buffer address field of the first direct control block (12) points to the next DCB (13) of the same message, as shown by dart (12-1). As the next DCB 13 is associated to a data buffer which contains the last data buffer of the message, the next buffer address field stores 'FF', whereas the next message address field of the first DCB will store the address of the data buffer which contains the next message if there is any. It is not necessary to store the address of the next message in the second DCB. As previously mentioned, those direct control blocks (12) and (13) may be stored in the CBS. Associated to those direct control blocks (DCB), there are indirect control blocks (ICB) (14), (15) and (16) which point to the original control block (12) via the MCCB pointer field represented by darts (14-1), (15-1) and (16-1).

Those indirect control blocks store in their duplication field the indication 'FF'. Only the next buffer address is empty because this field is only used when the indirect control block is enqueued in the FICBQ. The other field of those ICB will store the necessary information if there is any.

Figure 10B:
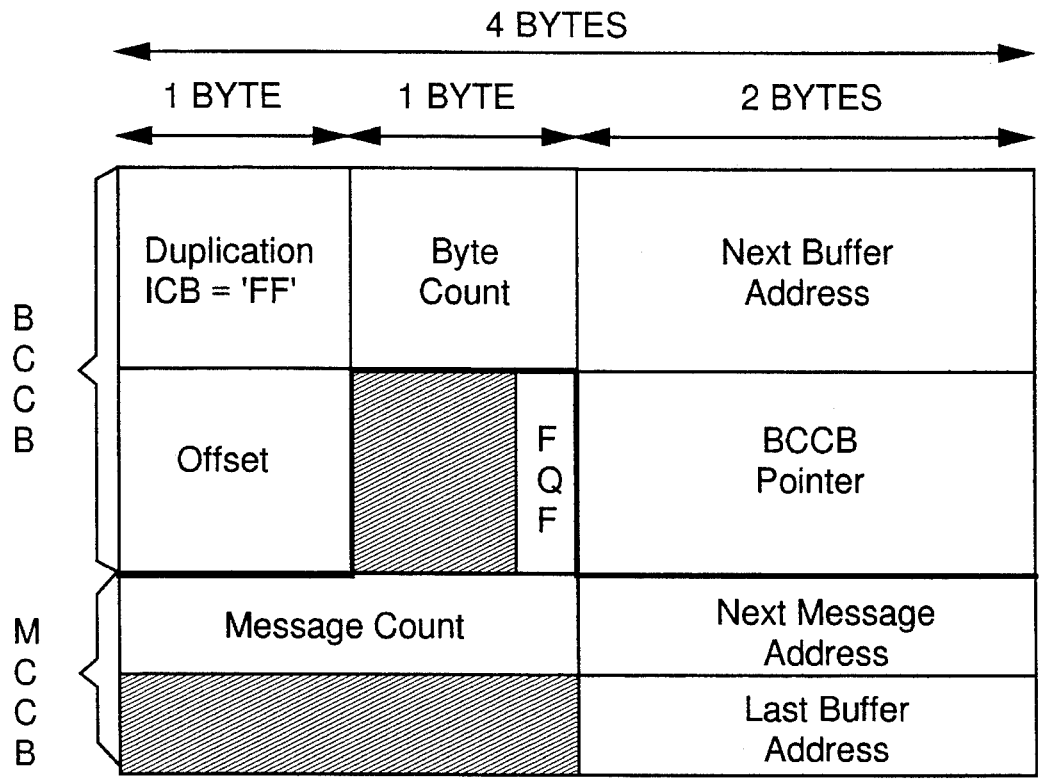
FIG. 10-A represents the different fields of the extended direct control block.
Figure 10A:
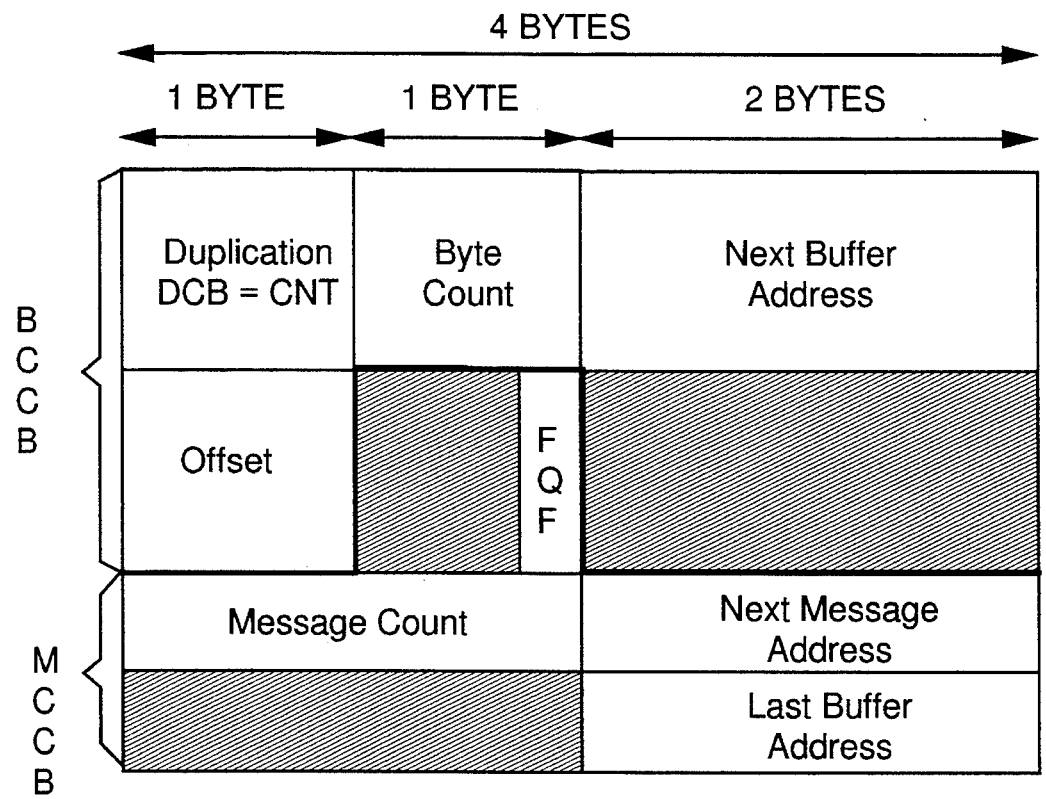

FIGS. 10-A and 10-B show the different fields that an extended direct and indirect control blocks contain.

The main purpose of the extended control block, direct or indirect, is to associate each ICB to each data buffer mapped to a DCB. It means that by duplicating the control blocks at the buffer level, instead of message level, it becomes possible to create messages with different data contents via the offset indication field and the byte count indication field on each DCB and ICB, refer to FIG. 3. That extension can be used to implement TCP/IP segmentation function.

But this extension requires some amendments in certain fields of the direct and indirect control blocks.

FIG. 10-A describes in detail the fields that the extended direct control block contains in addition to the elementary fields already described in FIG. 3-A:

- a duplication field of 1 byte which indicates the value of the duplication number of the data implicitly referenced by the control block,
- a byte count field of 1 byte which gives the number of bytes used in that buffer,
- a next buffer address field of 2 bytes, in the case of the DCBs, this field is used to chain the DCBs—then their associated data buffers—in a user queue (then the chained buffers form a message) or in the Free DCB queue (then all the free buffers are chained in this queue),
- an offset field of 1 byte which indicates the beginning of the data in that buffer,
- a Free Queue Flag (FQF) field of 1 bit which indicates that the chain of buffers forming a message is in the Free queue, when it is equal to 1,
- a void field of 2 bytes,
- a total message count field of 2 bytes which gives the number of bytes used in that message,
- a next message address field of 2 bytes, and
- a last buffer address field of 2 bytes which gives the address of the last DCB (and then the data buffer) of a message.

FIG. 10-B shows in detail the different fields that an extended indirect control block contains.

Some ICB fields have been modified.

- the Next Buffer Address field also enable chaining ICBs of the same message in a user queue (in addition to the chaining of ICBs in the FICBQ),
- the MCCB pointer field becomes the BCCB pointer field, which enables associating one DCB per ICB in a chain of ICBs forming a message,
- the last buffer address field is used in the same way as the DCBs for the ICB Release operation.

Figure 11:
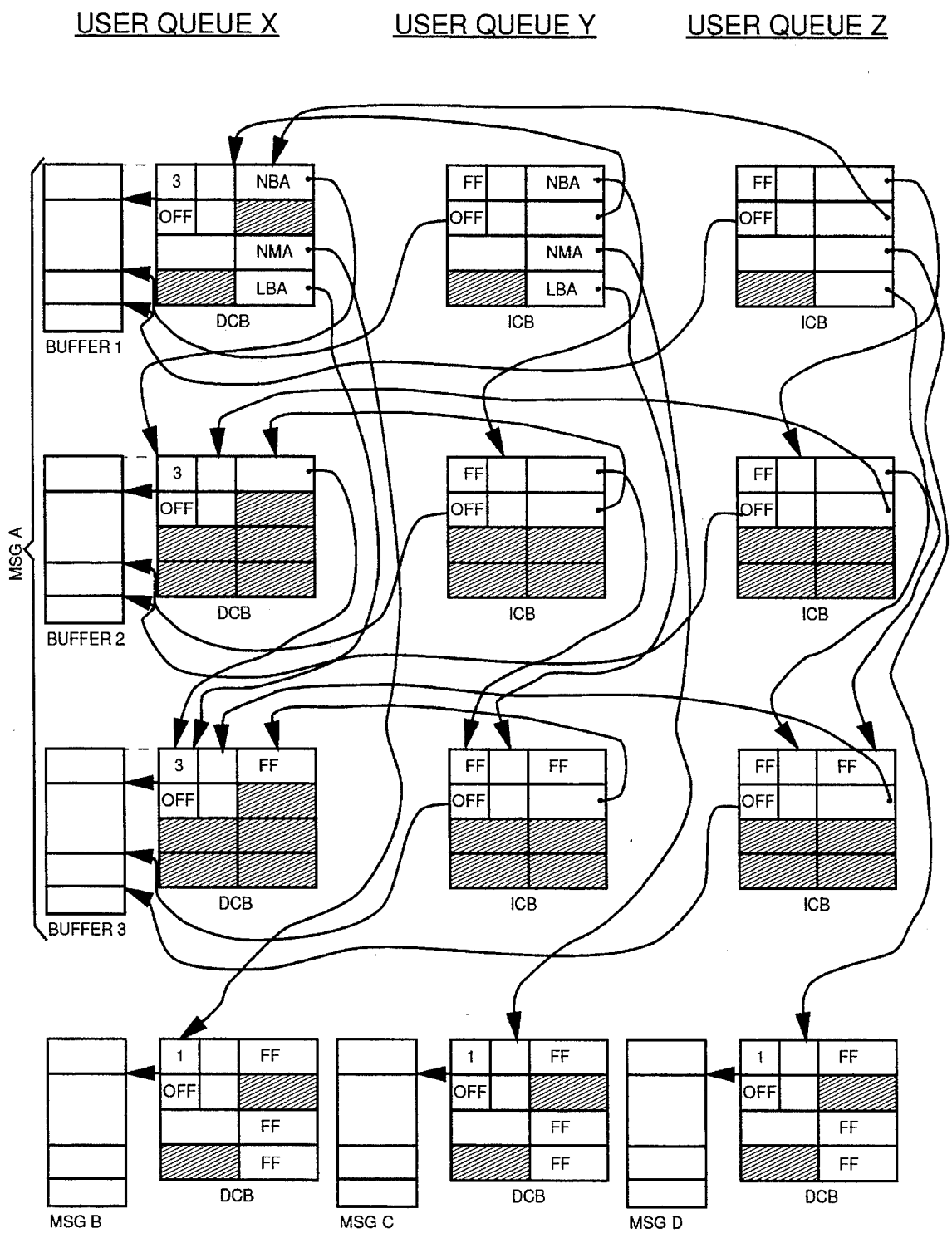
FIG. 11 shows an example of the multicast operation using the extended direct and indirect control blocks.

FIG. 11 illustrates an example of the multicast processing when using the extended control block to provide more sophisticated functions than the multicasting of messages.

Basically, the multicasting is used for messages duplication, each message may comprise a unique data buffer or a chained data buffers, and each message being associated to a message control block. This basic multicasting enables, therefore, referencing several time the same data (message content). This example illustrates the duplication at the level of data buffer. The duplicated buffer represented by the indirect control block may have a different content than the original data buffer represented by the direct control block.

This example shows the case wherein a message (Msg A) is shared by 3 users (X, Y, Z) represented by the user queues X, Y, Z. Message A is the first message in the queue of the three users, and it has 3 data buffers (buffer 1, buffer 2, buffer 3). The user queue X contains the direct control blocks, whereas the user queue Y and Z will contain the indirect control blocks associated to message A.

The first data buffer (buffer 1) is mapped to a first DCB whose next buffer address field points to the second DCB mapped to the second data buffer (buffer 2). This second DCB also points to a third DCB mapped to the third data buffer (buffer 3). The address of this third DCB is also stored in the last buffer address field of the first DCB. Each DCB has an offset field which enables to indicate the beginning of the data buffers, and in combination with the byte count field, the DCB content is determined. Besides, the duplication number of each of said DCB is incremented to the number 3 because each data buffer (buffer 1 to 3) are pointed by the ICB of the user queues Y and Z which are described latter on.

The user queue X also stores a second message B whose address is stored in the next message address field of the first DCB. This second message which contains a single data buffer is mapped to a single DCB whose duplication number is '1', because this message has not been duplicated to any other user.

As is said before, this example illustrates the complex case wherein to each ICB corresponds a data buffer, but no ICB is mapped to a data buffer. Hence, the user queue Y stores the three ICBs, each one pointing to the DCBs previously mentioned thanks to the BCCB pointer field of the ICB.

The offset field of each ICB enables differentiating the content of each duplicated data buffer from the original data buffer, and the next buffer address field of each ICB points to the next ICB whereas the last ICB stores the code 'FF'. Besides, the last buffer address of the first ICB points to the last ICB which is the third ICB of the message A duplicated for this user Y.

The first ICB also stores in the next message address field the address of the next control block corresponding to the next message. In this example, a message C mapped to a DCB is enqueued to the user queue Y. This message which has not been duplicated, stores, in duplication field, the number '1'.

The message has also been duplicated to the user Z. Therefore, the ICBs corresponding to the message A are stored in the user queue Z and respect the same mechanism as the one described for the user queue Y. The message A of the user Z is followed by a second message D containing a single data buffer and mapped to a single DCB.

It should also be said that all the ICBs mentioned above store in the duplication fields the code 'FF' to indicate the type of the control block. In case an ICB is initially a DCB mapped to a data buffer, the code 'FF' in the duplication field enables the control block to be considered as an ICB and the data buffer is therefore voided.

We claim:

1. A method of multicasting messages to a plurality of destination users (152, 154) in a communications system comprising a memory (100) shared by said destination users and accessed by said users through a data store bus (101), said memory (100) being organized in a plurality of data buffers controlled by a plurality of control blocks, wherein each message to be multicast is composed of chained data buffers, and wherein to each destination user is associated a user queue which stores the control blocks of the messages of said user, said user queue being controlled by a user queue control block, said method of multicasting messages comprising the step of:

(a) organizing said plurality of control blocks in a plurality of direct control blocks (DCB) wherein each of said direct control blocks is associated with a data buffer whose address has an assigned relationship with the address of the corresponding direct control block;

(b) building a free direct control block queue (FDCBQ) which stores the addresses of all free direct control blocks and chaining said free direct control blocks, said queue being controlled by a free direct queue control block (FDQCB) which stores the addresses of the first, and the last free direct control blocks respectively in a head (H) field and a tail (T) field;

(c) organizing said plurality of control blocks in a plurality of indirect control blocks (ICB) to enable multicast function to be performed message by message;

(d) building a free indirect control block ueue (FICBQ) which stores the addresses of all the free indirect control block and chaining said free indirect control blocks, said indirect control block queue being controlled by a free indirect queue control block (FIQCB) which stores the addresses of the first and the last free indirect control blocks respectively in its head (H) field and its tail (T) field;

(e) leasing a necessary number of free direct control blocks from said free direct control block queue (FDCBQ), each free direct control block being associated with a free data buffer, in order to store the message received in said free data buffer;

(f) storing in said free direct control blocks the information relative to the associated data buffers which constitute the original message;

(g) enqueueing said message in a message queue of a selected user by enqueueing the associated direct control blocks in said selected user queue;

(h) leasing successively a free indirect control block from the free indirect control block queue (FICBQ) to store information relative to the message to be multicast in each of said indirect control blocks for each multicasting operations;

(i) storing the information relative to the message to be multicast in each one of said free indirect control blocks, each indirect control blocking pointing to the direct control block corresponding to the first data buffer of the original message, each one of said indirect control blocks representing a duplicated message;

(j) enqueueing said indirect control block in the message queue of each user to which the message has to be transmitted for each one of the multicasting operations;

wherein the enqueueing said indirect control block further includes storing in said indirect control block the address reference of the direct control block corresponding to the first data buffer of said original message, incrementing the number contained in the duplication field in said direct control block, reading the tail field of the user queue control block which indicates the address of a direct control block corresponding to the last data buffer or an indirect control block, already enqueued in said user queue, writing the address of said indirect control block to enqueue in said tail field, and writing the address of the new indirect control block to enqueue in the previous direct or indirect control block already enqueued in said user queue, and releasing after dequeuing from a user queue an original message which corresponds to a plurality of direct control blocks or a duplicated message which corresponds to a unique indirect control block to move them back to the free direct control block queue or the free indirect control block queue, said release operation comprising the steps of reading (70) the duplication field, checking (71) if said duplication field stores the special code ('FF'), if the special code is detected, releasing said indirect control block by reading the tail field of the FIQCB which indicates the address of the last free indirect control block, writing the address of a new indirect control block in the tail field, and also, writing the address of said new indirect control block in the last ICB enabling said last ICB to point to the new ICB, reading (74) the duplication number of the direct control block which is associated to said new indirect control block, if the duplication field does not store the special code ('FF') decrementing (75) the duplication number, checking (76) if the duplication number is equal to zero, if it is not equal to zero, which means that the message has been multicast to other users and is still necessary, then ending the release operation, otherwise, releasing (77) said plurality of DCBs which correspond to said message by reading the tail field of the FDQCB which indicates the address of the 1st free direct control block, writing the address of the last direct control block of said plurality of DCBs to release in the tail field, and writing in the last free direct control block already enqueued in the FDCBQ the address of the first DCB of said plurality of DCBs to release.

2. A method of multicasting messages to a plurality of destination users (152, 154) in a communications system comprising a memory (100) shared by said destination users and accessed by said users through a data store bus (101), said memory (100) being organized in a plurality of data buffers controlled by a plurality of control blocks, wherein each message to be multicast is composed of chained data buffers, and wherein to each destination user is associated a user queue which stores the control blocks of the messages of said user, said user queue being controlled by a user queue control block, said method of multicasting messages comprising the steps of:

(a) organizing said plurality of control blocks in a plurality of direct control blocks (DCB) wherein each of said direct control blocks is associated with a data buffer whose address has an assign relationship with the address of the corresponding direct control block;

(b) building a free direct control block queue (FDCBQ) which stores the addresses of all free direct control blocks and chaining said free direct control blocks, said queue being controlled by a free direct queue control block (FDQCB) which stores the addresses of the first and the last free direct control blocks respectively in a head (H) field and a tail (T) field;

(c) organizing said plurality of control blocks in a plurality of indirect control blocks (ICB) to enable a multicast function to be performed message by message;

(d) building a free indirect control block queue (FICBQ) which stores the addresses of all the free indirect control block and chaining said free indirect control blocks, said indirect control block queue being controlled by a free indirect queue control block (FIQCB) which stores the addresses of the first and the last free indirect control blocks respectively in its head (H) field and its tail (T) field;

(e) leasing a necessary number of free direct control blocks from said free direct control block queue (FDCBQ), each free direct control block being associated with a free data buffer, in order to store the message received in said free data buffer;

(f) storing in said free direct control blocks the information relative to the associated data buffers which constitute the original message;

(g) enqueueing said message in a message queue of a selected user by enqueueing the associated direct control blocks in said selected user queue;

(h) leasing successively a free indirect control block from the free indirect control block queue (FICBQ) to store information relative to the message to be multicast in each of said indirect control blocks for each multicasting operations, said leasing the free indirect control block including selecting one of the two free queues (free indirect control block queue FICBQ or free direct control block FDCBQ), reading the head field of he selected free queue which indicates the address of a free direct control block or a free indirect control block, reading the address of the next free direct control block or free indirect control block indicated by said direct or indirect control block, writing the address of said next free direct control block or indirect control block in the head field of said selected free queue, and storing a special code ('FF') in a duplication field 16 of said direct control block or indirect control block leased to specify that said control block is to be used as an indirect control block, wherein in case a direct control block is selected because the free indirect control block queue is empty, a corresponding data buffer is voided;

(i) storing the information relative to the message to be multicast in each one of said free indirect control blocks, each indirect control block pointing to the direct control block corresponding to the first data buffer of the original message, each one of said indirect control blocks representing a duplicated message;

(j) enqueueing said indirect control block in the message queue of each user to which the message has to be transmitted for each one of the multicasting operations;

wherein the enqueueing said indirect control block further includes storing in said indirect control block the address reference of the direct control block corresponding to the first data buffer of said original message, incrementing the number contained in the duplication field in said direct control block, reading the tail field of the user queue control block which indicates the address of a direct control block corresponding to the last data buffer or an indirect control block, already enqueued in said user queue, writing the address of said indirect control block to enqueue in said tail field and writing the address of the new indirect control block to enqueue in the previous direct or indirect control block already enqueued in said user queue, and releasing after dequeuing from a user queue an original message which corresponds to a plurality of direct control blocks or a duplicated message which corresponds to a unique indirect control block to move them back to the free direct control block queue or the free indirect control block queue, said release operation comprising the steps of reading (70) the duplication field, checking (71) if said duplication field stores the special code ('FF'), if the special code is detected, releasing said indirect control block by reading the tail field of the FIQCB which indicates the address of the last free indirect control block, writing the address of a new indirect control block in the tail field, and also, writing the address of said new indirect control block in the last ICB enabling said last ICB to point to the new ICB, reading (74) the duplication number of the direct control block which is associated to said new indirect control block, if the duplication field does not store the special code ('FF') decrementing (75) the duplication number, checking (76) if the duplication number is equal to zero, if it is not equal to zero, which means that the message has been multicast to other users and is still necessary, then ending the release operation, otherwise, releasing (77) said plurality of DCBs which correspond to said message by reading the tail field of the FDQCB which indicates the address of the 1st free direct control block, writing the address of the last direct control block of said plurality of DCBs to release in the tail field, and writing in the last free direct control block already enqueued in the FDCBQ the address of the first DCB of said plurality of DCBs to release.

\* \* \* \* \*